(12) United States Patent
Dotsey et al.

(10) Patent No.: US 7,694,980 B2
(45) Date of Patent: Apr. 13, 2010

(54) HANDLE FOR COLLAPSIBLE STROLLER

(75) Inventors: Michael A. Dotsey, Pottstown, PA (US); Patrick Nolan, Royersford, PA (US); Michiel Sebastiaan Emanuél Petrus Knoppert, Chicago, IL (US); Karen Rosenkranz, London (GB); Merijn Hartog, Amsterdam (NL); Marcel Arthur Jan Schreuder, Amsterdam (NL)

(73) Assignee: Graco Children's Products Inc., Atlanta, GA (US)

( * ) Notice: Subject to any disclaimer, the term of this patent is extended or adjusted under 35 U.S.C. 154(b) by 548 days.

(21) Appl. No.: 11/696,183

(22) Filed: Apr. 3, 2007

(65) Prior Publication Data

US 2007/0290469 A1 Dec. 20, 2007

Related U.S. Application Data

(60) Provisional application No. 60/789,240, filed on Apr. 3, 2006.

(51) Int. Cl.
*B62B 9/20* (2006.01)

(52) U.S. Cl. .............................. 280/47.371; 280/47.36; 280/655; 280/655.1

(58) Field of Classification Search ................. 280/642, 280/639, 647, 650, 651, 654, 655, 655.1, 280/47.36, 47.371, 87.051, 47.25, 47.34, 280/47.38, 62; 16/110.1–430; *B62B 9/20*
See application file for complete search history.

(56) References Cited

U.S. PATENT DOCUMENTS

| | | | | |
|---|---|---|---|---|
| 613,633 A | * | 11/1898 | King et al. ................. 74/551.7 |
| 3,223,430 A | * | 12/1965 | Fitzsimmons ................ 280/42 |
| 3,503,276 A | * | 3/1970 | Vigot .......................... 74/544 |
| 3,796,439 A | * | 3/1974 | Perego ....................... 280/644 |
| 3,873,117 A | * | 3/1975 | Perego ....................... 280/650 |
| 3,887,208 A | * | 6/1975 | Vidal .......................... 280/648 |
| 3,936,069 A | * | 2/1976 | Giordani ..................... 280/650 |
| 4,256,325 A | * | 3/1981 | Fleischer .................... 280/649 |

(Continued)

FOREIGN PATENT DOCUMENTS

DE 44 16 737 11/1995

(Continued)

OTHER PUBLICATIONS

International Search Report and Written Opinion issued in International application No. PCT/US2007/065901 mailed Aug. 27, 2007.

(Continued)

*Primary Examiner*—Glenn Dayoan
*Assistant Examiner*—Jacob Meyer
(74) *Attorney, Agent, or Firm*—Lempia Braidwood LLC

(57) ABSTRACT

A stroller handle assembly has a handle with a grip part. The handle is movable from an in-use position extending from the stroller frame to a collapsed position lying adjacent and parallel along the stroller frame. The assembly has a bracket for attaching the handle to the stroller frame. The bracket has one part configured to allow rotation of the handle sideways away from the in-use position to a partly collapsed position. The bracket has a different part configured to allow the handle to rotate to the completely collapsed position adjacent the stroller frame.

16 Claims, 22 Drawing Sheets

U.S. PATENT DOCUMENTS

| | | | |
|---|---|---|---|
| 4,448,434 A * | 5/1984 | Anderson | 280/40 |
| 4,448,435 A | 5/1984 | Hon | |
| 4,587,864 A * | 5/1986 | Kassai | 74/551.3 |
| 4,813,701 A * | 3/1989 | Balland | 280/641 |
| 5,167,069 A * | 12/1992 | Quinn | 30/527 |
| 5,249,438 A * | 10/1993 | Rhaney et al. | 62/457.7 |
| 5,354,089 A * | 10/1994 | Sohrt et al. | 280/645 |
| 5,630,601 A * | 5/1997 | vom Braucke et al. | 280/40 |
| 5,709,400 A | 1/1998 | Bonnier et al. | |
| 6,099,022 A | 8/2000 | Pring | |
| 6,193,263 B1 | 2/2001 | Lin | |
| 6,203,054 B1 | 3/2001 | Matsumoto | |
| 6,209,892 B1 | 4/2001 | Schaaf et al. | |
| 6,301,749 B1 * | 10/2001 | Chen | 16/429 |
| 6,398,233 B1 | 6/2002 | Liang et al. | |
| 6,446,990 B1 | 9/2002 | Nania et al. | |
| 7,011,335 B2 * | 3/2006 | Kight | 280/655.1 |
| 7,017,936 B2 * | 3/2006 | Huang | 280/642 |
| 7,226,059 B1 * | 6/2007 | Samuels | 280/33.992 |
| 7,396,038 B2 | 7/2008 | Zweideck | |
| 7,438,308 B2 * | 10/2008 | Kim et al. | 280/655.1 |
| 2002/0074774 A1 * | 6/2002 | Hsu et al. | 280/655.1 |
| 2002/0117826 A1 * | 8/2002 | Lee | 280/87.041 |
| 2003/0132614 A1 * | 7/2003 | Kreamer | 280/655.1 |
| 2003/0214107 A1 * | 11/2003 | Fernandez | 280/47.371 |
| 2004/0227329 A1 * | 11/2004 | Zweideck | 280/642 |
| 2005/0173896 A1 * | 8/2005 | Kim et al. | 280/655 |
| 2006/0001226 A1 | 1/2006 | Refsum | |
| 2006/0027984 A1 * | 2/2006 | Huang | 280/47.371 |
| 2006/0157945 A1 * | 7/2006 | Refsum | 280/47.371 |
| 2008/0093828 A1 * | 4/2008 | Kim et al. | 280/655.1 |

FOREIGN PATENT DOCUMENTS

| | | |
|---|---|---|
| DE | 201 16 567 | 12/2001 |
| DE | 203 20 209 | 3/2004 |
| DE | 203 20 208 | 4/2004 |
| EP | 1 447 302 | 8/2004 |
| GB | 2 403 934 | 1/2005 |
| JP | 53 061835 | 6/1978 |
| JP | 2000 085672 | 3/2000 |

OTHER PUBLICATIONS

Britax Preview Lightweight Umbrella Travel System (Jun. 2004).

* cited by examiner

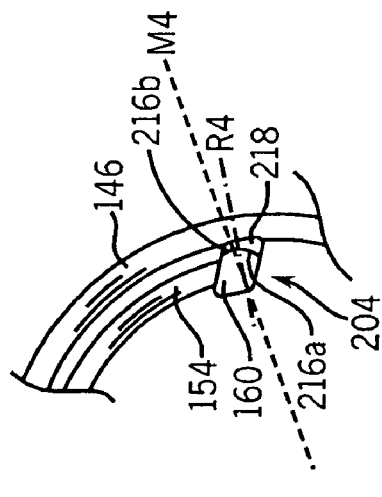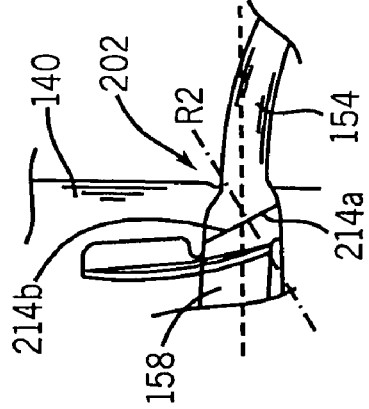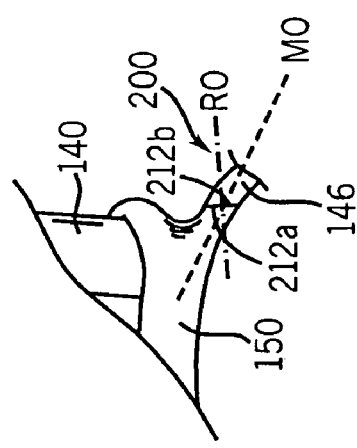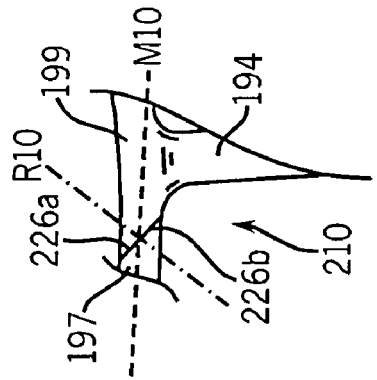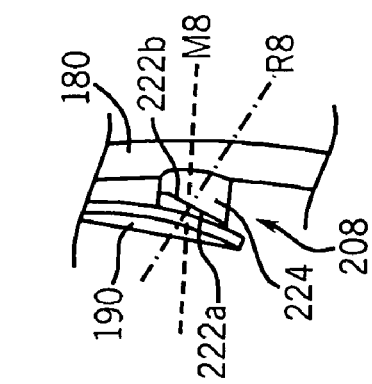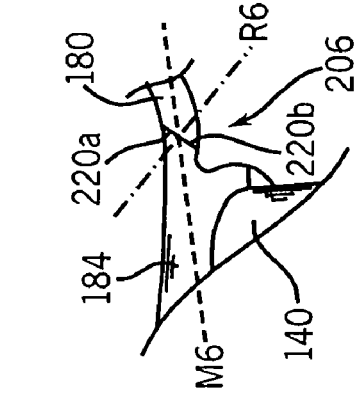
FIG. 5A  FIG. 5B  FIG. 5C
FIG. 5D  FIG. 5E  FIG. 5F

HANDLE FOR COLLAPSIBLE STROLLER

RELATED APPLICATION DATA

This patent is related to and claims priority benefit of U.S. Provisional Patent Application No. 60/789,240, which was filed on Apr. 3, 2006 and entitled "Stroller," and which is hereby incorporated by reference in its entirety.

BACKGROUND OF THE INVENTION

1. Field of the Disclosure

The present invention is generally directed to strollers, and more particularly to a stroller frame structure and stroller handle assembly that are each movable between an in-use configuration and a folded or collapsed configuration.

2. Description of Related Art

Strollers that contact the ground at three general locations, sometimes called "three-wheeled" strollers, are known in the art. This type of stroller is typically a more high-end type stroller and many of these strollers are intended for use during strenuous activity such as jogging or the like. Such strollers typically are either not collapsible or are difficult and cumbersome to collapse or break down to a more portable configuration. These types of three-wheeled strollers also typically have two spaced apart frame sides that converge toward one another near the lone front wheel or wheel assembly. The seat is typically disposed between the frame sides. Thus, this type of stroller is fairly wide and bulky when in the in-use configuration.

Strollers that fold in three dimensions are also known in the art. There are currently a number of different foldable strollers that are known and that permit folding the stroller and its frame in three dimensions. These stroller configurations have frame links that can fold to allow the stroller to collapse inward or in a width-wise direction. These types of strollers typically incorporate a box-type frame configuration that is also employed in most conventional four-point contact or four-wheeled strollers. Typical three dimensional folding stroller configurations often fold by releasing a centrally located or laterally oriented fold link and then collapsing the stroller frame width-wise, length-wise, and height-wise. Examples include umbrella-type three dimensional folding strollers including Peg Perego's PLAIKO P3 stroller and Graco's CLEO stroller. These fold configurations typically require quite a bit of motion and effort on the part of the user to facilitate folding. Such box type strollers also require a relatively large number of parts and complex fold geometries to permit folding in all three dimensions.

Virtually every stroller has one or more handles or a handle assembly of some type. The handles are positioned so that the user can manipulate and push the stroller. However, there are very few features built into typical stroller handles that would allow the user to retain better control over the stroller product. Most strollers provide a pair of push arms that curl upward to form an umbrella-type handle on each side of the stroller or have a transverse frame portion that extends across between two frame parts on the stroller to create a handle bar. Strollers that collapse in two dimensions often employ the transverse bar handle configuration because the handle does not need to collapse in a width-wise direction. Strollers that collapse in three dimensions often employ only the umbrella-type handles so that there is no handle bar or link between the two frame sides that need be collapsed. Thus, most strollers provide a very limited number of grip options for the caregiver, and a majority of strollers provide only one grip option.

BRIEF DESCRIPTION OF THE DRAWINGS

Objects, features, and advantages of the present invention will become apparent upon reading the following description in conjunction with the drawing figures, in which:

FIGS. 5A-5F show a close up fragmentary view of each of the frame joints on the stroller frame shown in FIGS. 1-5.

DETAILED DESCRIPTION OF THE DISCLOSURE

The stroller disclosed herein solves or improves upon one or more of the above noted and other problems and disadvantages with known strollers. For example, the frame assembly of the disclosed stroller can collapse in three dimensions and yet does not have a traditional box-like frame structure, has a reduced number of components, and folds easily with little effort or maneuvering. Also, the disclosed stroller includes a handle assembly that can fold or collapse in to accommodate folding of the stroller. The disclosed handle assembly can still provide a variety of different grip locations, orientations, and configurations for a caregiver. These and other objects, features, and advantages of the present invention will become apparent upon a review of the attached drawing figures and the detailed description below.

Figure 1:
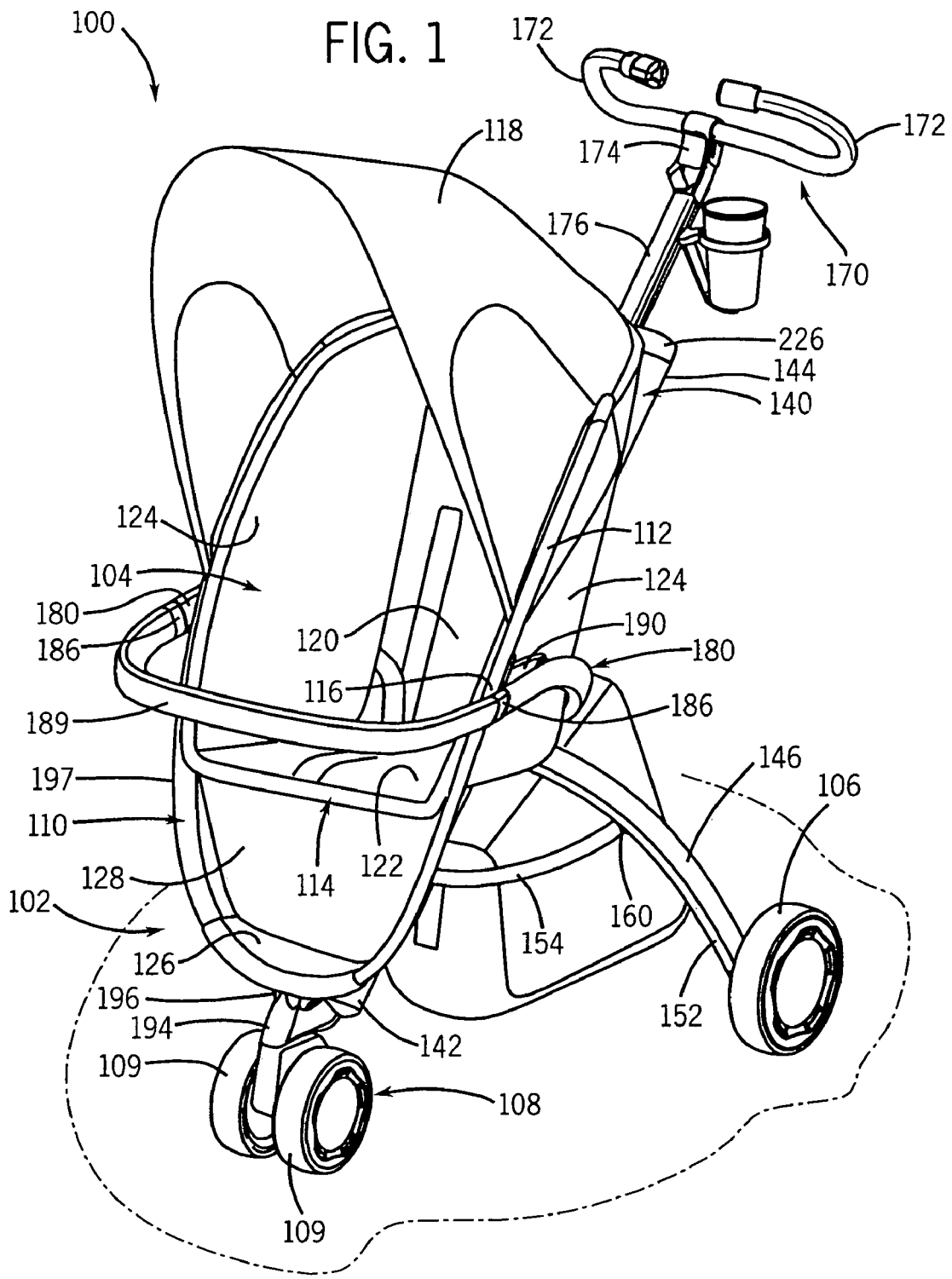
FIG. 1 shows a perspective view of one example of a stroller assembly and a handle assembly in an in-use configuration and constructed in accordance with the teachings of the present invention.
Figure 2:
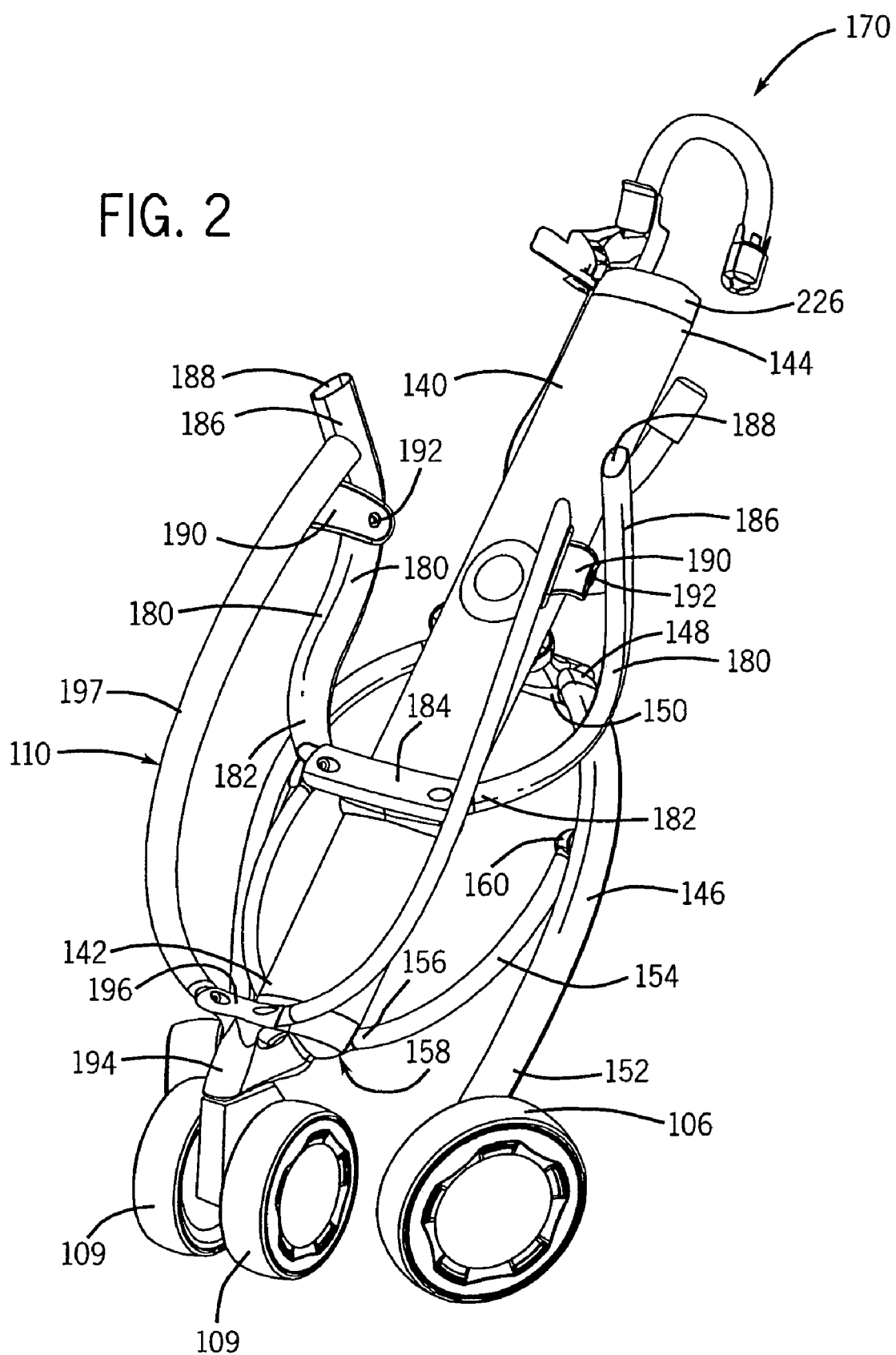
FIG. 2 shows a perspective view of the stroller frame, minus the seat assembly, of the FIG. 1 in a folded or collapsed configuration.
Figure 3:
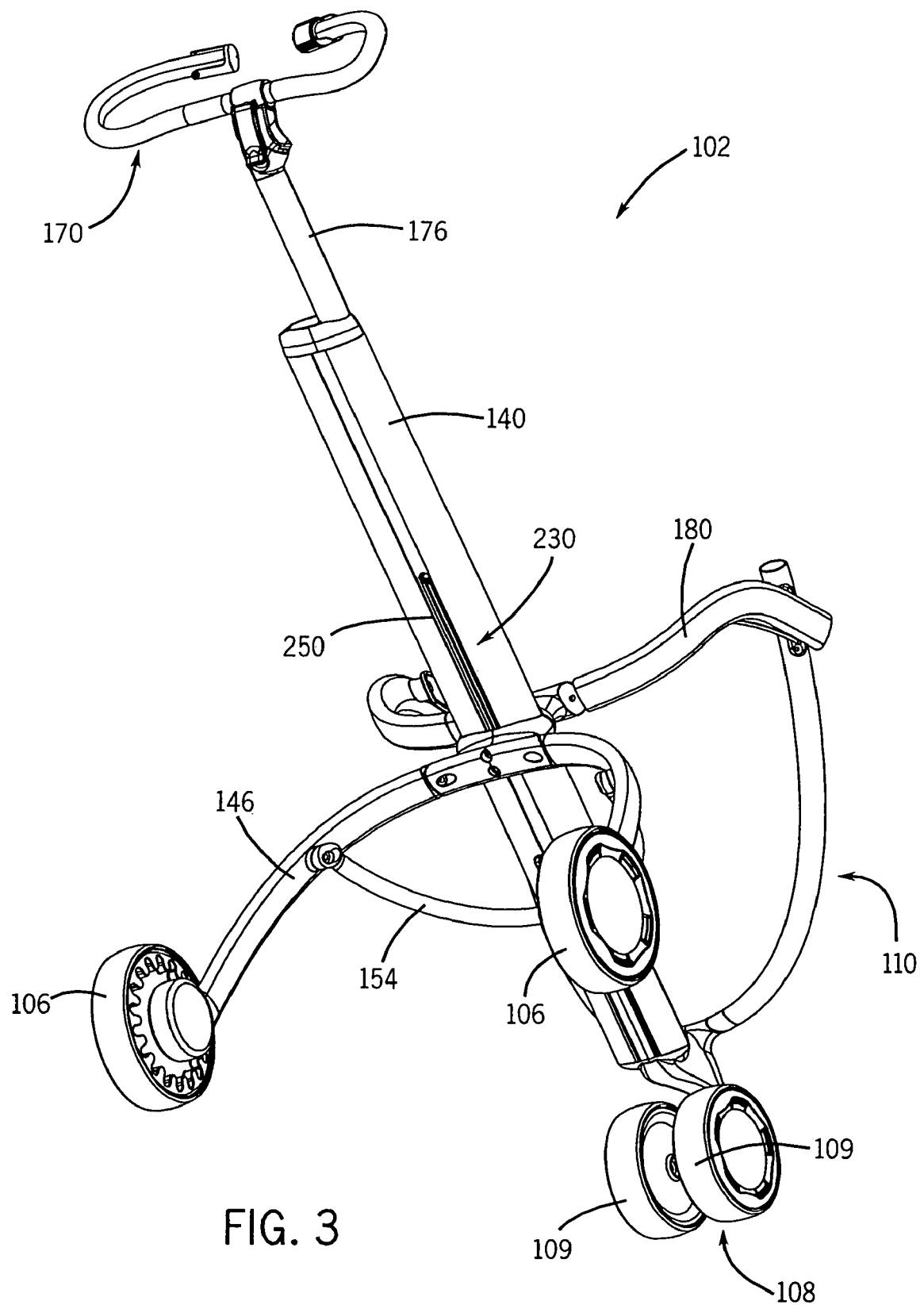
FIG. 3 shows a rear perspective view of the stroller frame shown in FIG. 2 and in the unfolded or in-use configuration.

Turning now to the drawings, a stroller 100 is depicted in FIGS. 1-3 and is constructed in accordance with the teachings of the present invention. In the disclosed example, the stroller 100 generally has a frame assembly 102, a seat assembly 104 supported by the frame assembly, and a plurality of wheels supporting the frame assembly on a ground surface. In general, the frame assembly 102 in the disclosed example includes a pair of rear wheels 106 and a single front wheel assembly 108 positioned forward of and at a mid point between the rear wheels. In this example, the front wheel assembly has two wheels 109 spaced apart side by side.

The frame assembly 102 in this example generally has a seat mounting frame 110 that is a U-shaped component. In the disclosed example, the seat assembly 104 can be removed from the seat frame 110 and the stroller 100. In general, the removable seat assembly 104 includes a pair of seat attachment tubes 112 positioned on opposite sides of an occupant seat 114. The seat tubes 112 are connected to and can be removed from upper ends 116 of the seat frame 110. The seat 114 of the seat assembly 104 is supported on the stroller at least in part by the seat tubes 112 and has a canopy 118 connected to an upper part of the seat. The seat 114 also has a seat back 120, a seat bottom 122, and seat side wings 124 positioned on opposite sides of the seat back and the seat bottom.

A footrest 126 is positioned at the bottom of the seat assembly 104 and is suspended from the front edge of the seat bottom 122 by a mesh fabric panel 128 in this example. The footrest 126 is also connected to the lower part of the seat frame 110. In the disclosed example, the seat 104 can be made entirely of fabric or like materials and be suspended from the seat tubes 112 and the seat frame 110, when attached. Alternatively, portions of the seat assembly 104 can have a removable cover placed over a generally rigid supporting structure that defines and shapes at least part of the seat, such as the seat bottom 122 and parts of the seat side wings 124. Thus, once attached to the seat frame 110, the seat assembly 104 can be sufficiently supported on the stroller and substantial enough to support the weight of a child occupant. As will be evident to those having ordinary skill in the art, the configuration and construction of the seat assembly 104 and the seat 114 can vary considerably and yet fall within the spirit and scope of the present invention.

The stroller frame assembly 102 in the disclosed example generally has a central spine 140 with a lower end 142 positioned near the front wheel assembly 108. The spine 140 also has an upper end 144 positioned behind the seat back 120 of the seat assembly 114 and between the rear wheels 106. A pair of curved rear legs 146 extends downward in opposite directions from an underside of the spine 140. Each leg 146 is bowed outward and extends in a rearward and downward direction. A proximal or top end 148 of each leg is coupled to a rear leg connector 150 positioned on the underside of the spine 140. The connector 150 is positioned in this example about mid-point between the upper end 144 and the lower end 142 of the spine 140. A distal or lower end 152 of each rear leg 146 in this example carries one of the rear wheels 106.

A rear leg link 154 is positioned on each side of the frame assembly 102 and links each rear leg 146 to the spine 40. Each link 154 has one end 156 coupled to a connector 158 on the underside of the spine 140 positioned below the rear leg connector 150 along the spine. Each link 154 also has another end 160 coupled to a corresponding one of the rear legs 146. The links 154 provide stability for the stroller frame assembly 102, and particularly for the rear legs 146, during use.

The frame assembly 102 in the disclosed example also has a stroller handle 170 for pushing and maneuvering the stroller 100. The disclosed handle 170 generally has an upward facing, open C-shape that forms two handle sections 172. The two sections 172 extend in opposite directions from a handle bracket 174. The handle bracket 174 is coupled to a stanchion 176 that extends from the upper end 144 of the frame spine 140. In the disclosed example, the stanchion 176 is essentially a linear structure and extends parallel to and is aligned with the spine 140, which is also a generally linear structure.

The stroller 100 disclosed herein also has a pair of curved seat frame support arms 180. The support arms 180 extend upward in opposite directions from the top side of the spine 140. Each support arm 180 is bowed outward and extends in a forward and upward direction relative to the spine 140. A proximal or bottom end 182 of each support arm 180 is coupled to a support arm connector 184 positioned on the top side of the spine 140. The support arm connector 184 in this example is positioned at the same location along the spine as the rear leg connector 1507 which is on the underside of the spine. A distal end portion 186 of each support arm 180 is bent downward, extends generally horizontally forward, and terminates at an exposed end or face 188.

In this example, a seat frame link 190 is positioned on each side of the seat frame 110 and extends in a rearward direction. Each seat link 190 has a free end 192 that is coupled to one of the support arms 180. The connection point between each seat link 190 and the respective support arm 180 in this example is spaced rearward from the exposed end 188 along the distal end portion 186.

Also in the disclosed example, a frame bracket 194 is located at the lower front portion of the frame assembly 102. The frame bracket 194 is connected to the lower most portion 196 of the seat frame 110 and to the lower end 142 of the spine 140. The front wheel assembly 108 is mounted to and extends downward from the frame bracket 194. The frame bracket 194 links the spine 140 to the seat frame 110 and provides the front wheel mounting location in the disclosed example.

The spine 140 is oriented centrally between the rear wheels 106 and defines a central or longitudinal axis of the stroller 100. In the disclosed example as shown in FIG. 2, the spine 140 is oriented at an angle with a low point at its lower end 142 and a high point at its upper end 144. The spine is oriented to position the handle 170 so that a caregiver can stand behind the stroller and push the stroller in a conventional manner by the handle 170. The seat assembly 104 is positioned above and forward of the spine 140 and faces forward relative to the stroller 100 away from the handle 170. However, the arrangement of the seat and frame components disclosed herein can vary and yet fall within the spirit and scope of the present invention. Additionally, the shape, size, configuration, orientation, and location of the various frame assembly and seat assembly components can also vary from the example shown without departing from the spirit and scope of the present invention.

In one example, the above stroller construction can be formed as a fixed structure that cannot be collapsed or folded. Such a stroller configuration would still provide a generally lightweight, easy to maneuver configuration. The stroller would be simpler in construction than an ordinary box-type frame stroller configuration and require fewer components to create the structure. However, in the disclosed example, the stroller 100 is collapsible or foldable from an in-use configuration shown in FIG. 1 to a folded or collapsed configuration shown in FIG. 2. As will become apparent below, the stroller 100 is also foldable in three dimensions.

Figure 4:
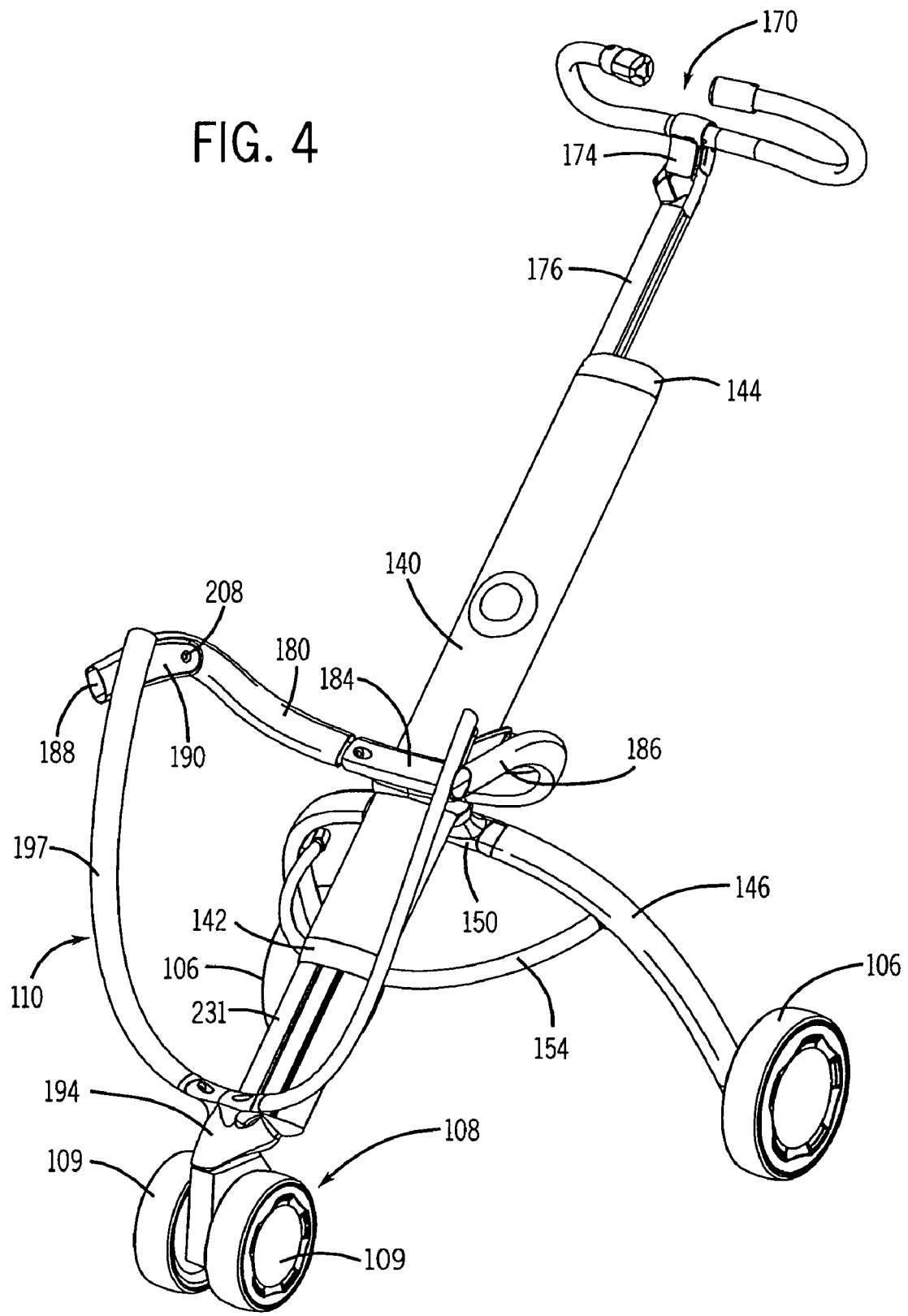
FIG. 4 shows a front perspective view of the stroller frame shown in FIG. 3.

With that in mind, FIG. 3 shows that the spine 140 is an oval hollow tube in the disclosed example. The stanchion 176 is telescopically received in the upper end 144 of the spine 140 and can move lengthwise or longitudinally relative to the spine. As depicted in FIGS. 3 and 4, the rear legs 146 are each coupled to the connector 150 at rotational or pivotal joints 200 and the leg links 154 are also each connected to the link connector 158 at rotational or pivotal joints 202. The other ends 160 of the leg links 154 are each pivotally connected to the respective rear legs 146 at pivot joints 204. In the disclosed example, the pivot joints 204 are located along the lengths of the rear legs 146 between the ends 148 and 152 of the legs. The support arms 180 are also each pivotally connected to the support arm connector 184 at rotational or pivotal joints 206. The free ends 192 of the seat links 190 are pivotally connected to the support arms 180 at pivot joints 208. In the disclosed example, the pivot joints 208 are spaced from the exposed faces 188 rearward along the distal ends 186 of the support arms.

Lastly, the seat frame 110 in this example is formed as three components at its lower portion 196. The seat frame 110 has two upstanding frame posts 197 that curve inward toward one another near the lower portion 196. The bottom ends 198 of the posts are pivotally coupled to a seat frame connector 199 carried on the frame bracket 194. The frame posts 197 are connected at pivotal or rotatable joints 210 to the connector 199. To facilitate three dimensional folding of the stroller 100, each of the joints 200, 202, 204, 206, 208, and 210 noted above is constructed having an angled surface relationship relative to the pivot axis at the joint and the orientation of the components at the joint. The relationship between these elements results in the stroller components simultaneously moving rotationally and laterally inward on the stroller spine 140 during folding.

For example, as shown in FIG. 5A, abutting bearing surfaces are provided at the joint 200 between the proximal or top end 148 of each rear leg 146 and the rear leg connector 150. Each leg joint 200 has a rotation axis R0 and an axis M0 defined by the orientation of the mating leg 146 and connector 150. An end bearing surface 212a on each of the rear legs 146 and bearing surface 212b on the connector 150 abut one another. These mating bearing surfaces 212a, 212b are oriented so as to lie in a plane that is neither parallel nor perpendicular relative to the axis M0 of the mating components. These surfaces 212a, 212b are also oriented generally normal or perpendicular to the rotation axis R0 so as to effect or permit rotation of the joint 200. The rotation axis R0 offset and the bearing surface 212a, 212b incline relative to the component axes M0 at the joint 200 causes the rear legs 146, when rotated during folding about the axis R0 to both rotate and translate laterally. The overall folding function will be described in greater detail below.

As shown in FIG. 5B, abutting bearing surfaces are also provided at the joint 202 between the one end 156 of each leg link 154 and the leg link connector 158. Each leg link joint 202 also has a rotation axis R2 and an axis M2 defined by the orientation of the mating links 154 and the connector 158. An end bearing surface 214a on each of the links 154 and a mating bearing surface 214b on the connector 158 also abut one another. Again, these mating bearing surfaces 214a and 214b are oriented so as to lie in a plane that is neither parallel nor perpendicular to the axis M2 of the mating components. The bearing surfaces 214a, 214b are oriented generally perpendicular to the rotation axis R2 to effect rotation at this joint 202. The arrangement causes the leg links 154 to rotate about the axis R2 during folding of the stroller as well as to translate laterally.

As shown in FIG. 5C, abutting bearing surfaces are also provided at the joint 204 between the other end 160 of each leg link 154 and the rear leg 146. Each link joint 204 has a rotation axis R4 and an axis M4 defined by the orientation of the leg link 154 components and rear leg 146. A bearing surface 216a is provided on a projection on a side surface of each leg link 154 adjacent the other end 160. A mating bearing surface 216b is provided on exposed surface of a spacer 218 coupled to each rear leg 146. The bearing surfaces 216a of the leg links 154 abut the bearing surfaces 216b on the spacers. These mating bearing surfaces 216a, 216b are E oriented so as to lie in a plane that is neither parallel nor perpendicular relative to the axis M4 of the leg link and the rear leg. These surfaces 216a, 216b, are also oriented normal or perpendicular to the rotation axis R4 to permit rotation at the joint 204. The relationship between the bearing surfaces and the axes at this joint also causes the rear legs 146 and leg links 154, when rotated during folding about the axis R4, to both rotate and translate laterally.

As shown in FIG. 5D, bearing surfaces are provided at the joint 206 between the proximal ends 182 of each support arm 180 and the arm connector 184. Each support arm joint 206 also has a rotation axis R6 and an axis M6 defined by the orientation of the mating support arms 180 and the connector 184. An end bearing surface 220a on each of the support arms 180 and a bearing surface 220b on the connector 184 abut one another. These mating bearing surfaces 220a, 220b are also oriented to lie in a plane that is neither parallel nor perpendicular relative to the axis M6 of the mating components. The surfaces 220a and 220b are oriented generally normal or perpendicular to the rotation axis R6 to effect rotation at the joint 206. The surface and axis relationship at the joint 206 causes the support arms 180, when rotated during folding about the axis R6, to both rotate and translate laterally.

As shown in FIG. 5E, bearing surfaces are provided at the joint 208 between the distal end portions 186 of the support arms and the seat links 190. Each joint 208 has a rotation axis R8 and an axis M8 defined by the orientation of the mating components. A bearing surface 222a is provided on a projection extending from a side of each of the seat links 190. A bearing surface 222b is provided on an exposed surface of a spacer 224 coupled to the inner side of each support arm 180. These bearing surfaces 222a, 222b are also oriented to lie in a plane that is neither parallel nor perpendicular to the axis M8 of the mating components. Again, these surfaces 222a, 222b are oriented normal or perpendicular to the rotation axis R8 to effect rotation of the joint 208. The surface and axis relationship causes the support arms 180, when rotated during folding about the axis R8, to rotate and to translate laterally.

As shown in FIG. 5F, bearing surfaces are also provided at the joint 210 between the bottom ends 198 of the seat frame posts 197 and the seat frame connector 199 on the frame bracket 194. Each joint 210 has a rotation axis R10 and an axis M10 defined by the orientation of the bottom ends 198 of the frame posts 197 and the connector 199. An end bearing surface 226a is formed on the bottom end 198 of each frame post 199 and a bearing surface 226b is formed on each side of the connector 199 and these bearing surfaces abut one another. The bearing surfaces 226a, 226b are oriented so as to lie in a plane neither parallel nor perpendicular to the axis M10 of these mating components. The surfaces 226a, 226b are also oriented normal or perpendicular to the rotation axis R10 to effect rotation at the joint 210. The relationship of the surfaces and axes at the joint 210 causes the seat frame posts 197, when rotated during folding about the axis R10, to rotate and to translate laterally.

Figure 6:
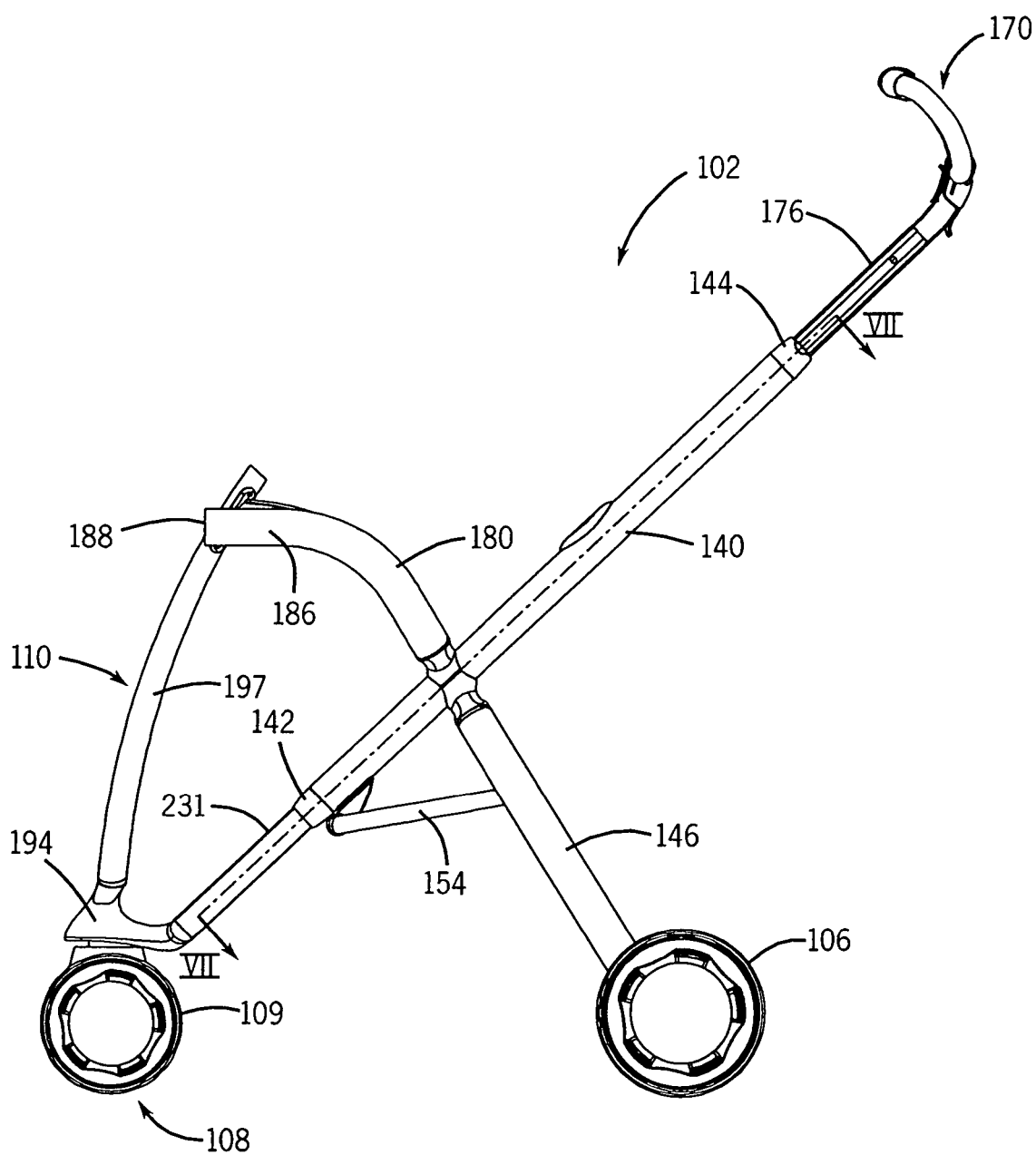
FIG. 6 is a side view of the stroller frame shown in FIG. 3.
Figure 7:
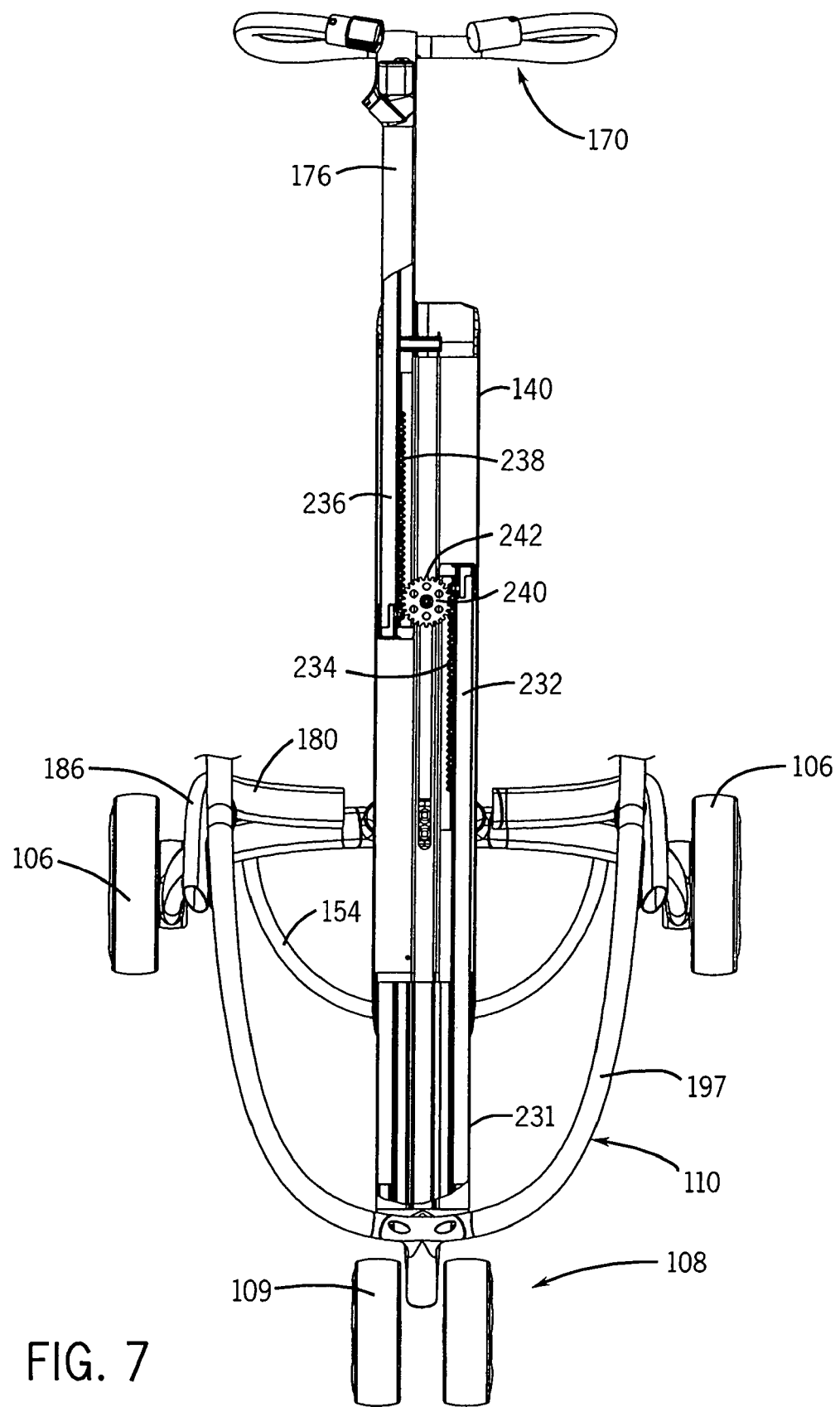
FIG. 7 is a cross section of the stroller frame taken along line VII-VII of FIG. 6.
Figure 8:
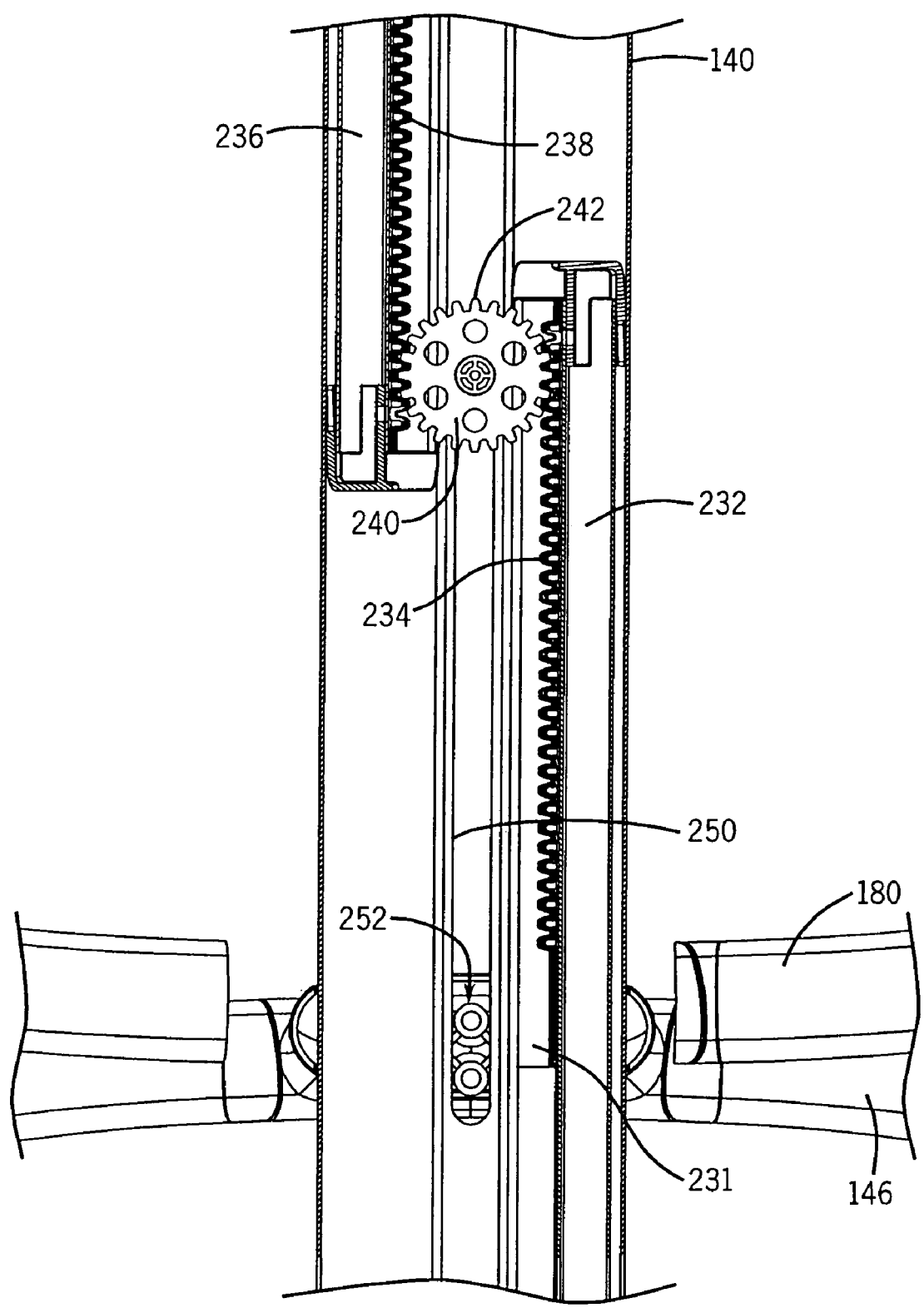
FIG. 8 is an enlarged view taken from circle VIII of a portion of the stroller frame cross section shown in FIG. 7.

As shown in FIGS. 6 and 7, a rack and pinion assembly 230 is provided on the interior of the spine 140 to facilitate smooth component movement as the stroller is folded or unfolded. In the disclosed example, the spine 140 has a telescoping two-part construction with a stationary or base part that we continue to identify herein as the spine 140. The hollow spine also has spine extension 231 that is telescopically received in the bottom opening of the spine base part 140. The exposed end of the spine extension defines the lower end 142 of the spine. The spine extension 231 is slidable longitudinally along the spine axis S relative to the base spine part 140. Thus, the length of the spine 140 between the upper end 144 and the lower end 142 can be altered during folding.

In the disclosed example, the rack and pinion assembly 230 includes a first linear rack 232 secured on the interior of the spine 140 to the slidable spine extension 231. Thus, movement of the first rack 232 can facilitate movement of the spine extension 231 along the spine axis S and vice versa. The rack 232 is positioned to one side within the oval interior of the extension and includes a plurality of teeth 234 exposed facing the open side of the spine interior. In one example, the teeth 234 are conventional gear teeth. Also as shown in FIG. 7, a secondary rack 236, also of a linear configuration, is carried on the lower end of the stanchion 176. Thus, movement of the stanchion 176 longitudinally along the spine axis S can facilitate movement of the second rack 236 and vice versa. In this example, the stanchion has a C-shape in cross-section with an open side and the rack is installed in the channel of the C-shape. The stanchion 176 is also positioned offset to one side of the oval interior of the spine 140. The second rack 236 and the first rack 232 are thus on opposite sides of the oval interior of the spine. The rack 236 includes a plurality of gear teeth 238 that face the open side. The teeth of the rack 236 are spaced from the teeth of the rack 232 across the interior of the spine 140 in this example and are oriented facing in opposite directions toward one another.

A stationary pinion 240 is affixed in position on the spine base part 140 and lies within the hollow interior. The pinion includes a plurality of gear teeth 242 around its circumference. The teeth 242 are sized to mesh with the gear teeth 234 and gear teeth 238 in both of the first and second racks 232, 236, respectively. The gap between the two racks is such the pinion fits between them and the pinion teeth can engage the teeth of both racks simultaneously. The pinion is mounted for free rotation about a gear axis G that is perpendicular to the spine axis S.

As shown in FIGS. 2-4, and 6-11, the stroller frame assembly 102 can be folded from the in-use configuration (FIGS. 3, 4, 6, and 7) to the folded or collapsed configuration (FIGS. 2 and 10A-11). The user can push the stanchion 176 via the handle 170 downward into the upper end 144 of the spine 140. Alternatively, the user can grasp and move the leg connector 150 along the spine 140 as discussed below. By doing either action, the second rack 236 moves downward passed the pinion 240. Meshing of the pinion teeth 242 with the teeth 238 on the second rack 236 causes the pinion 240 to rotate downward on the side of the spine that coincides with the stanchion 176. The teeth 242 on the opposite side of the pinion 240 are engaged with the teeth 234 on the first rack 232, and this side of the pinion 240 rotates upward. Pinion rotation (counter-clockwise in FIGS. 7 and 8) draws the rack 232 and thus the spine extension 231 upward into the spine 140 interior and the stanchion 176 downward. This significantly shortens the height or length of the stroller frame 102.

Figure 9A:
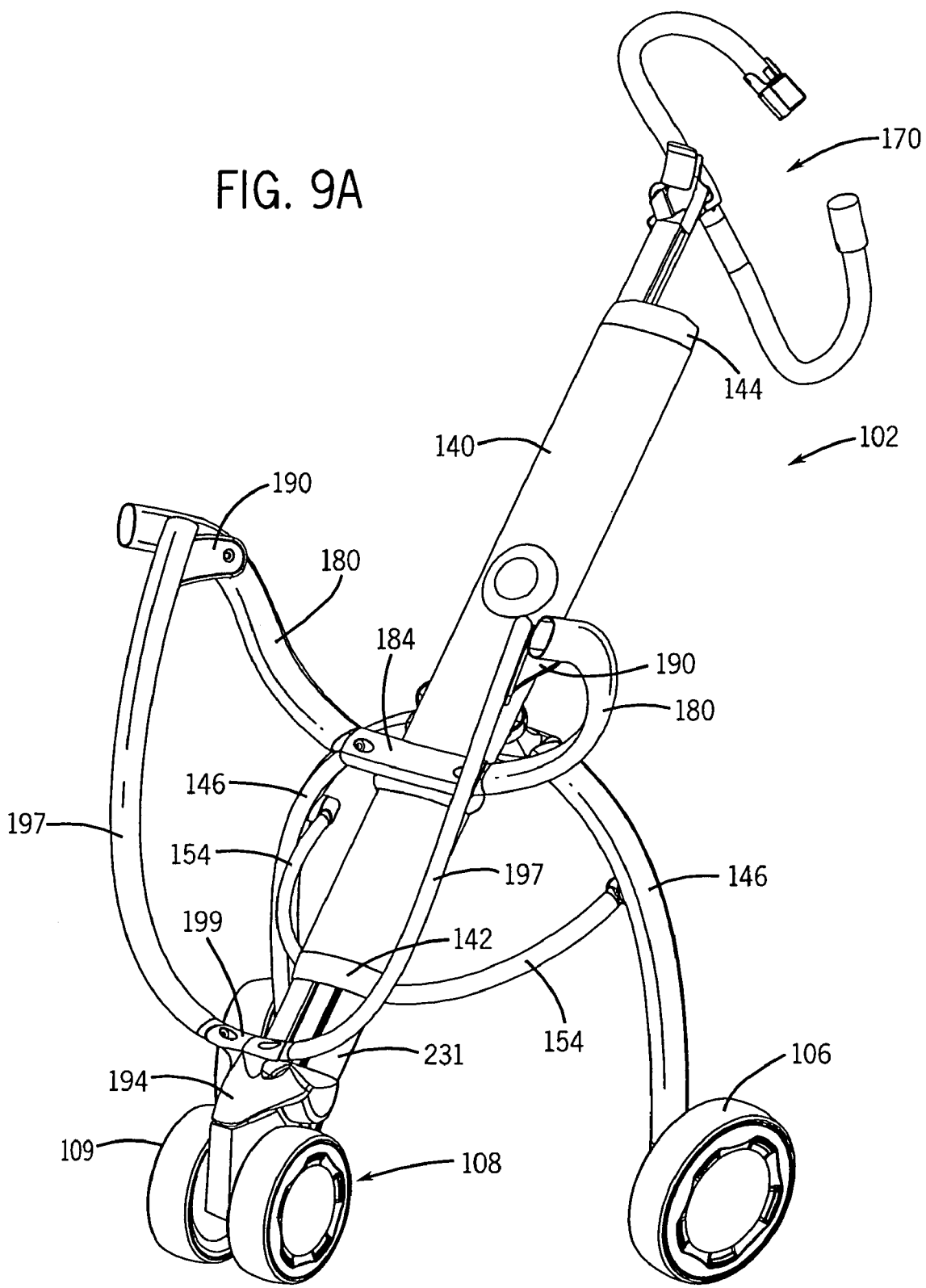
FIGS. 9A and 9B show front and rear perspective views, respectively, of the stroller frame shown in FIG. 3 in a partially folded or collapsed configuration.
Figure 9B:
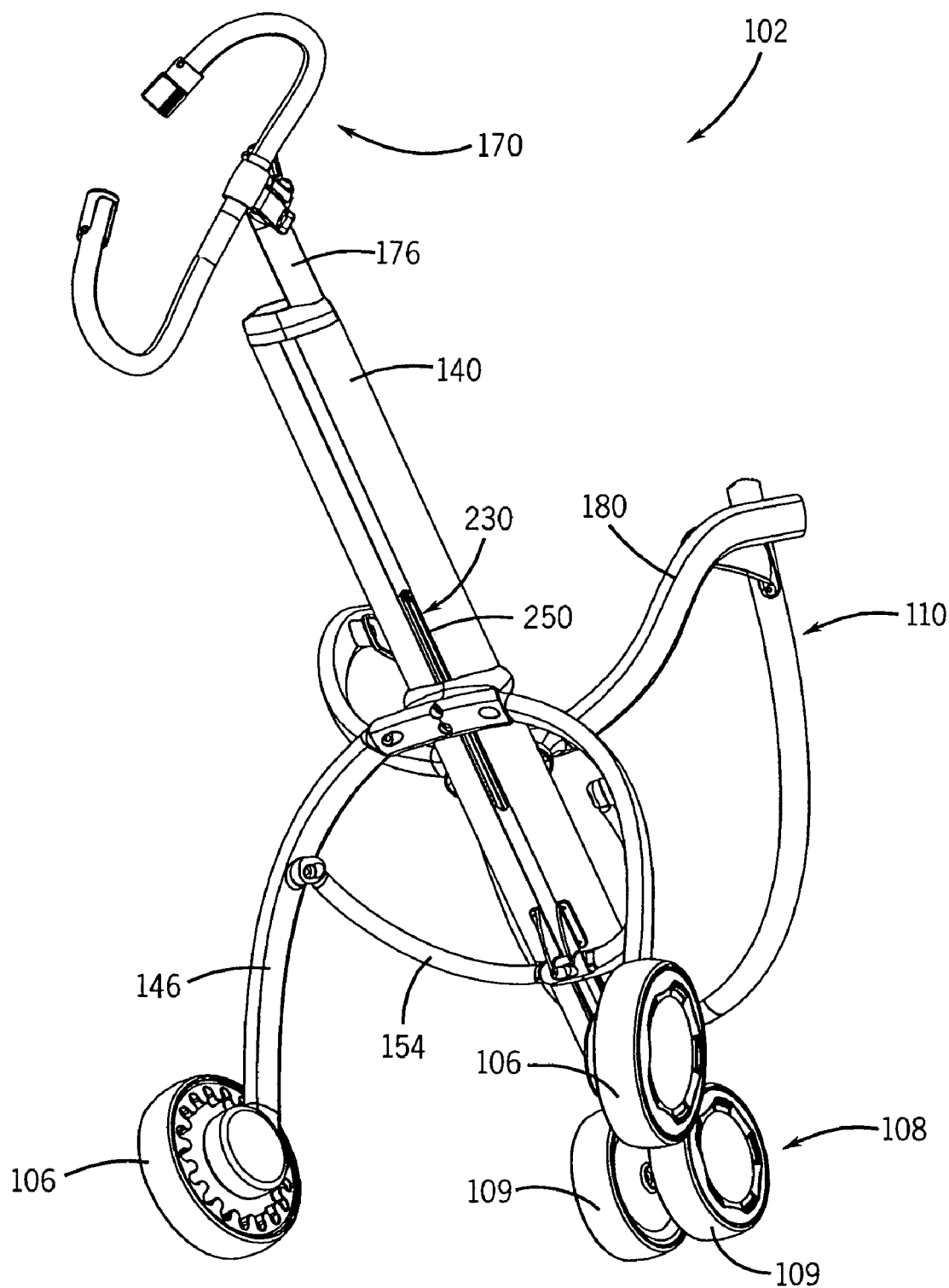

FIGS. 9A and 9B show the stroller 100 and frame assembly 102 in the partially collapsed configuration. Movement of the stanchion 176 downward and movement of the spine extension 231 upward results in the various stroller frame components beginning to move in concert. With reference to FIGS. 3, 8, 9B, and 10B, a slot 250 is provided on the underside of the spine 140. The leg connector 150 includes a coupling 252 that extends through the slot 250 into the interior of the spine 140. The coupling 252 is fixed to and slidable with the first rack 232 and/or the spine extension 231. Thus, as the connector 150 moves upward in the slot along the spine axis S, the top ends 148 of the rear legs 146, which are connector to the connector 150, move as well. The motion of the rear leg joints 200 causes movement at the other joints on the stroller frame assembly 102. The rear wheels 106 pivot or rotate with the rear legs toward the spine 140, driven by the leg links 154. The leg links 154 are fixed to the underside of the spine 140 at the connector 158. As the leg connector 150 moves, it moves further from the link connector 158 driving the leg motion. The rear legs 146 also move laterally inward toward one another based on the joint 200 geometry.

As shown in FIGS. 9A and 9B, the frame bracket 194 is connected to the frame extension 231 and thus moves as the extension slides upward. The seat frame 110 is fixed to the bracket 194. The support arms are attached to the arm connector 184, which is fixed to the top side of the stroller. As the stroller frame assembly 102 is moved from the in-use configuration to the collapsed configuration, the frame extension 231 and the frame bracket 194 are drawn upward along the spine axis S. The frame bracket 194 thus moves toward the support arm connector 184. As a result, the seat frame 110, including each of the frame posts 197, also moves upward toward the support arms 180. The seat links 190 are fixed to the frame posts and move with the posts. The seat links are pivotally attached at the joints 208 to the arms 180. The seat links 190 drive the ends 186 of the support arms 180 upward, causing them to rotate at the joints 206 on the arm connector 184 on the spine 140. Rotation of the support arms 180 and the joint 208 configuration cause the arms to pivot upward toward the spine 140 and to translate laterally inward toward one another. As the ends 186 of the support arms 180 draw closer to the spine 140, the seat posts 197 are also drawn in, pivoting about the bottom ends 198 at the joints 210. The configuration of the joints 210 also results in the seat frame posts 197 translating laterally inward toward one another.

Figure 10A:
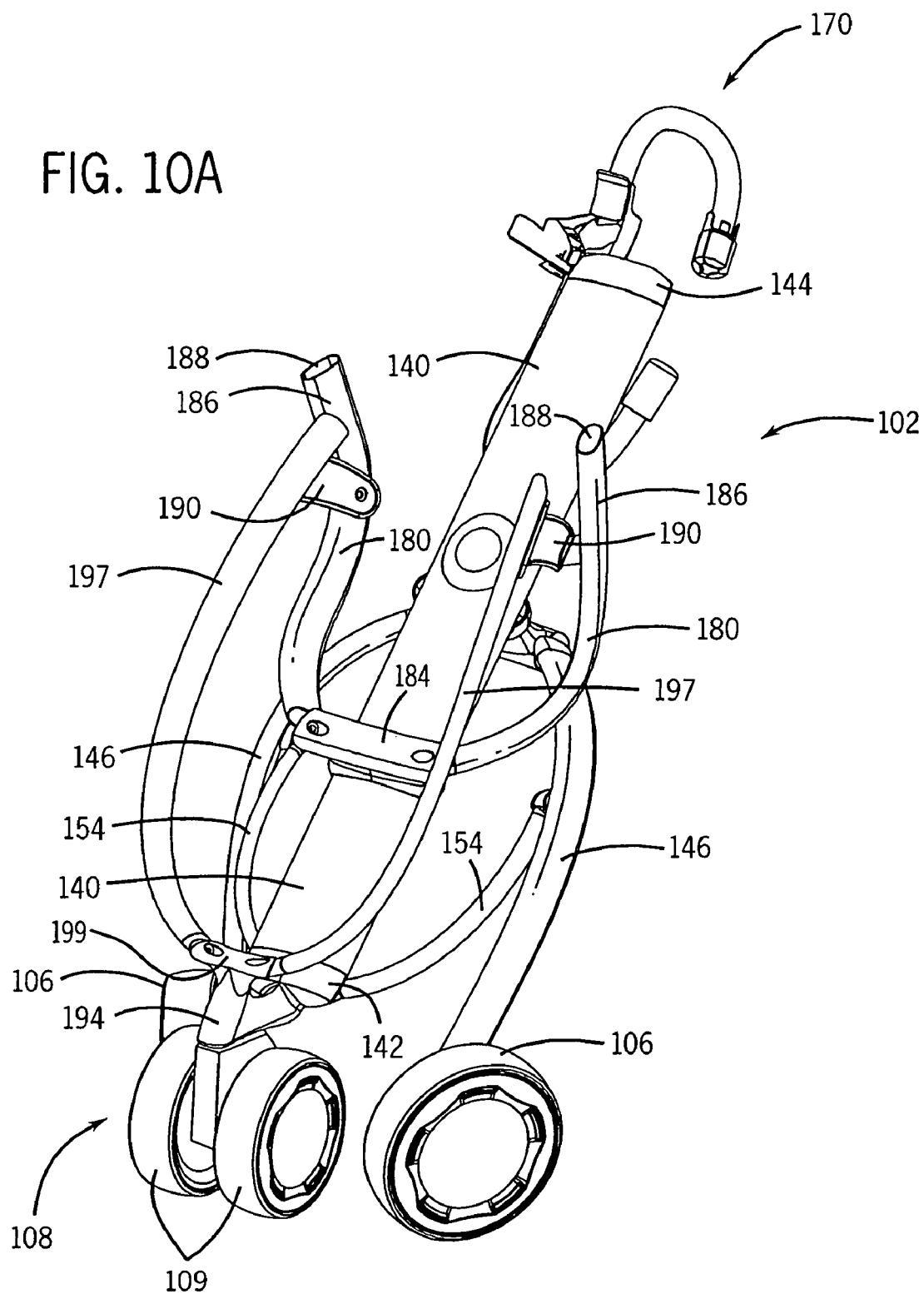
FIGS. 10A, 10B, and 10C show front and rear perspective views and a side view, respectively, of the stroller frame shown in FIG. 3 in a completely folded or collapsed configuration.
Figure 10B:
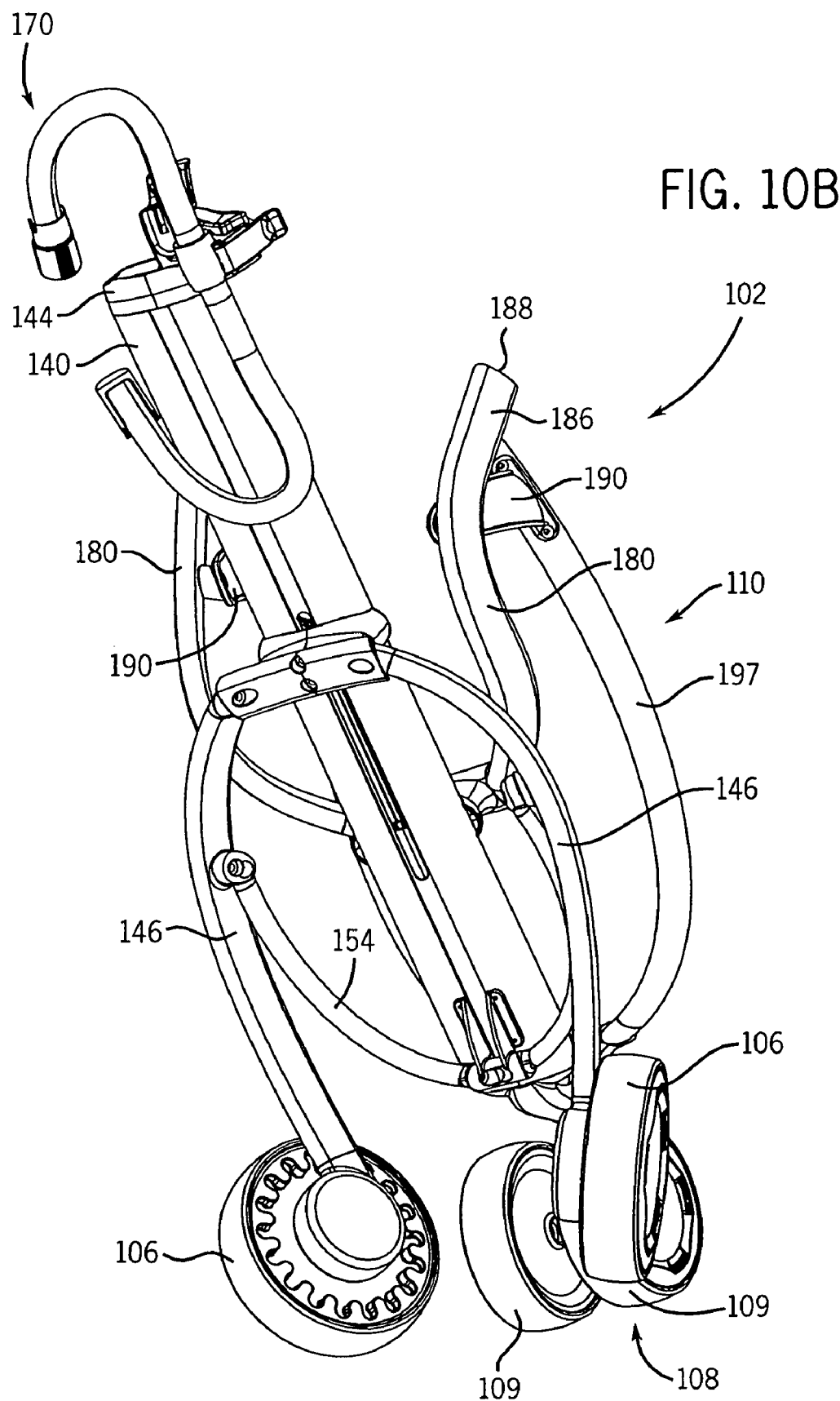
Figure 10C:
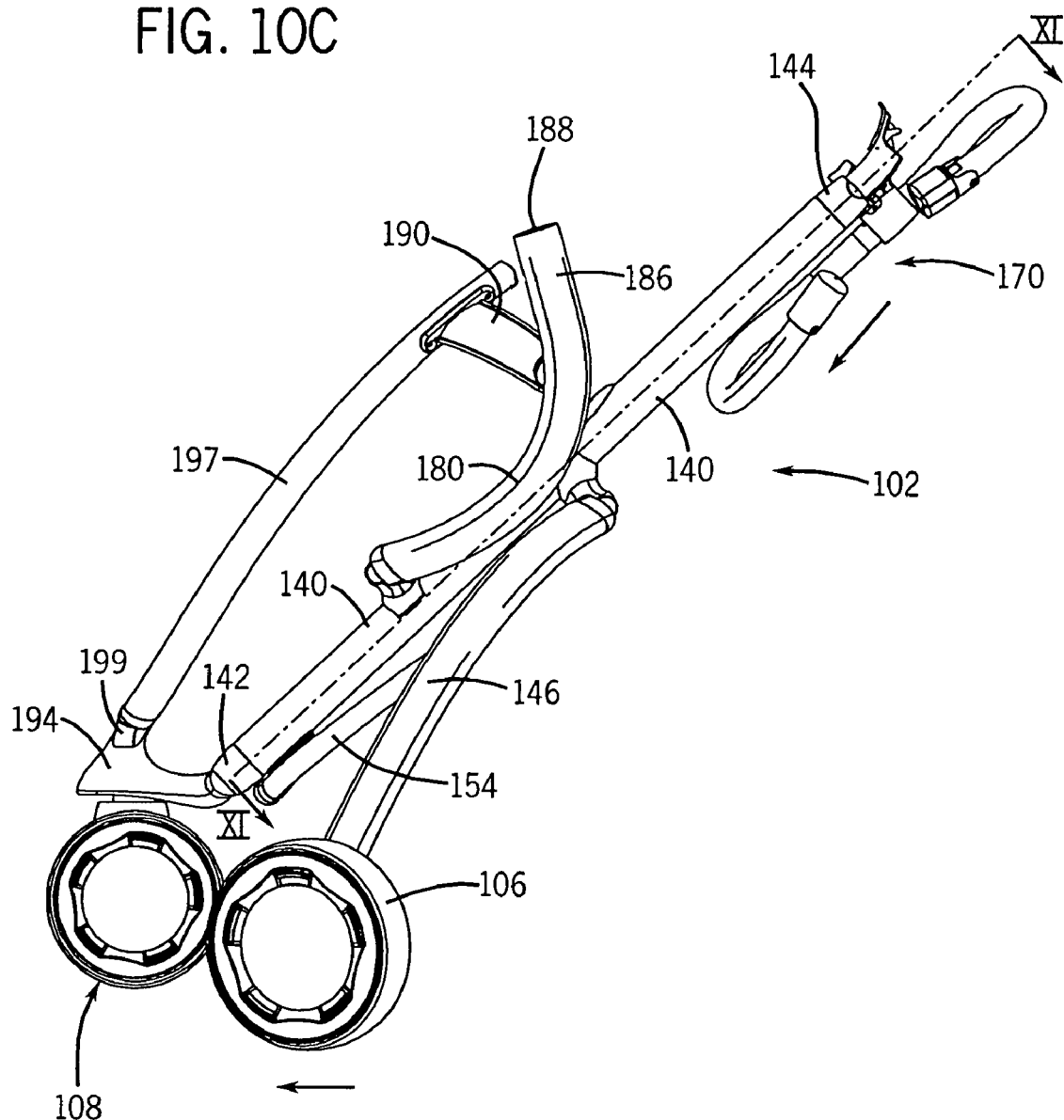
Figure 11:
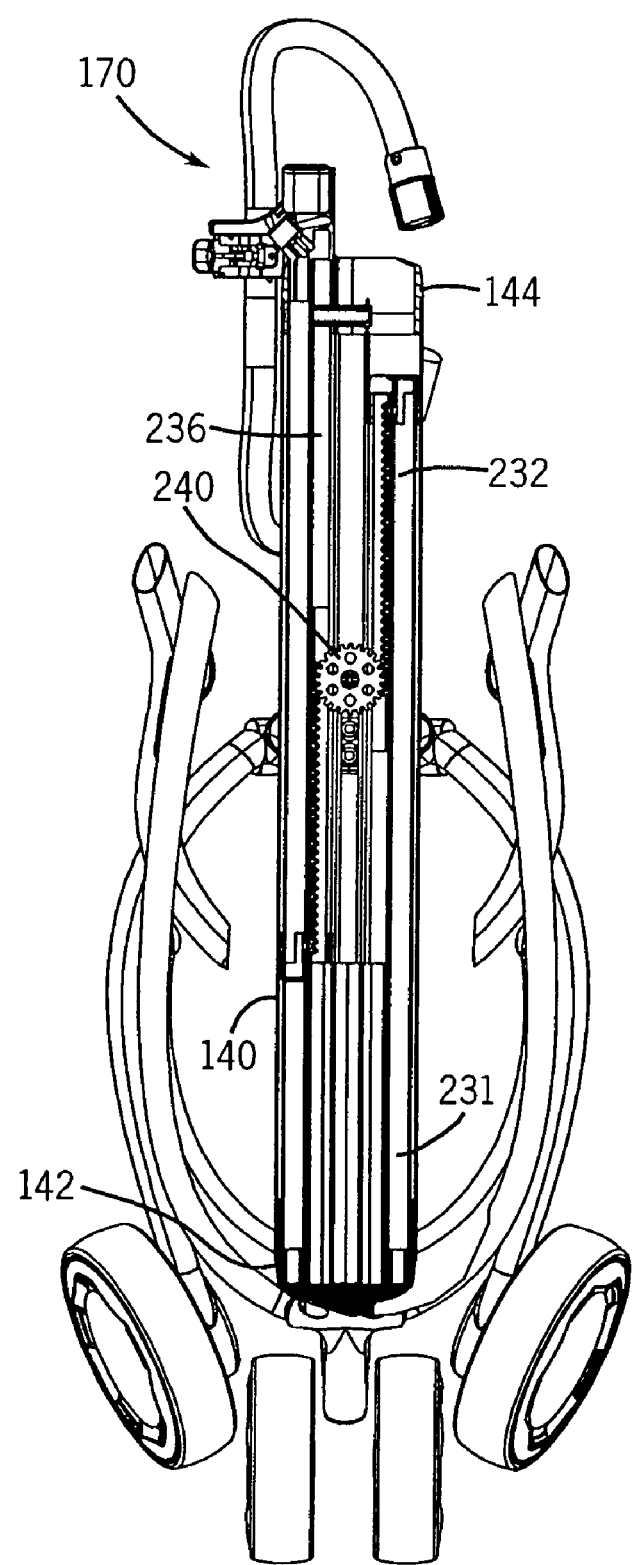
FIG. 11 shows a cross section of the folded stroller taken along line XI-XI in FIG. 10C.

FIGS. 10A-10C show the stroller frame assembly 102 upon being fully collapsed. As a result of the frame components pivoting toward the spine and translating laterally in ward toward the spine, the stroller 100 folds or collapses in three dimensions. The resulting collapsed frame structure is narrower in width and shorter in height and length when folded than when in the in-use configuration. FIG. 11 shows the collapsed positioning of the first and second racks 232, 236, the stanchion 176, the frame extension 231, and the legs, arms, and connecting components of the structure.

To unfold the stroller 100, a user need only pull the stanchion 176 upward and outward out of the frame spine 140. Alternatively, the user can push the connector 150 down along the slot 250 to accomplish unfolding. Either action will in turn drive all of the other components to move to the in-use configuration shown in FIGS. 3, 4, 6, and 7. When the stroller is in the collapsed configuration, the stanchion 176 and spine extension 231 in the disclosed example are telescoped into the interior of the spine 140 in a side by side relationship and creating a relatively short collapsed height for the frame assembly 102. In the unfolded configuration, both the stanchion 176 and spine extension 231 are telescoped outward and extend from the spine 140. The stanchion is offset to one side of the center axis S of the spine, however. In an alternate embodiment, the spine could be configured with an oval shape but with the taller diameter oriented vertically. This would center the stanchion along the axis S.

As will be evident to those having ordinary skill in the art, the stroller frame component relationship and positioning can vary. The various joint configurations, leg, arm, link, and frame components, and the position of the pivot joints can vary and yet fall within the spirit and scope of the present invention. Changes in geometric shape and component movement can be accomplished by altering the contour of the various frame components. Similarly, the joint locations can be moved from the positions shown in order to accomplish alterations in frame movement and folding configuration as well. Further, the bearing surfaces at the various joints can be altered, the rotation axes changed, and the relative angles between the bearing surfaces and the rotation axes manipulated to alter the in-use frame geometry, the fold motion, and the folded geometry. Additionally, other component arrangements can be employed with the various moving parts of the spine, stanchion, and frame extension, and yet achieve relative movement of the frame components disclosed and described herein. The rack and pinion mechanism parts, locations, and configurations can vary as well. The rack and pinion mechanism can be replaced with another type of mechanism that will still yield relative movement among the components if one of the components is driven, such as the stanchion 176 or the connector 150 herein.

Figure 12A:
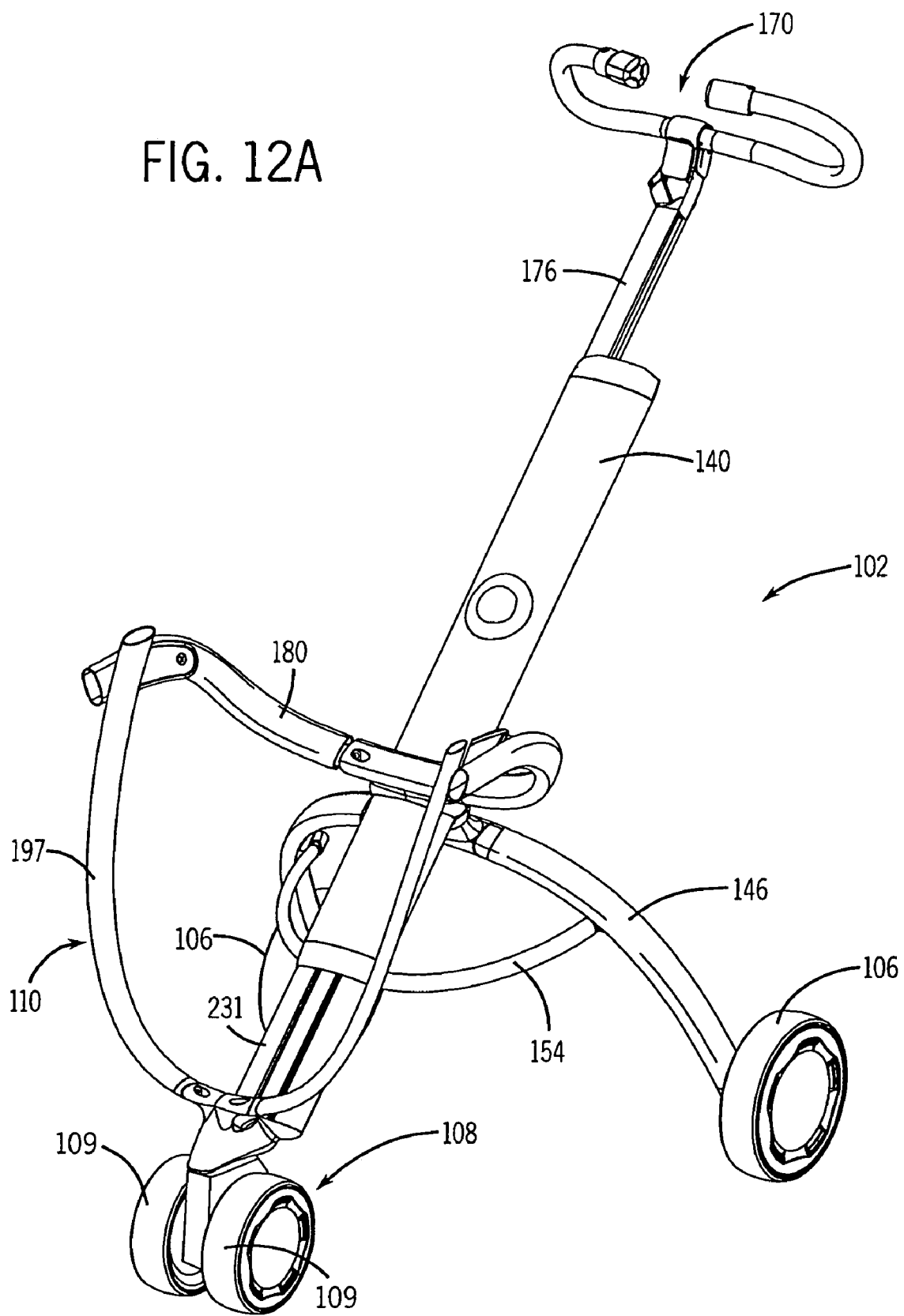
FIGS. 12A, 12B, and 12C show an alternative example of a stroller frame in an in-use, partially folded, and completely collapsed configurations and with the handle remaining in the in-use orientation.
Figure 12B:
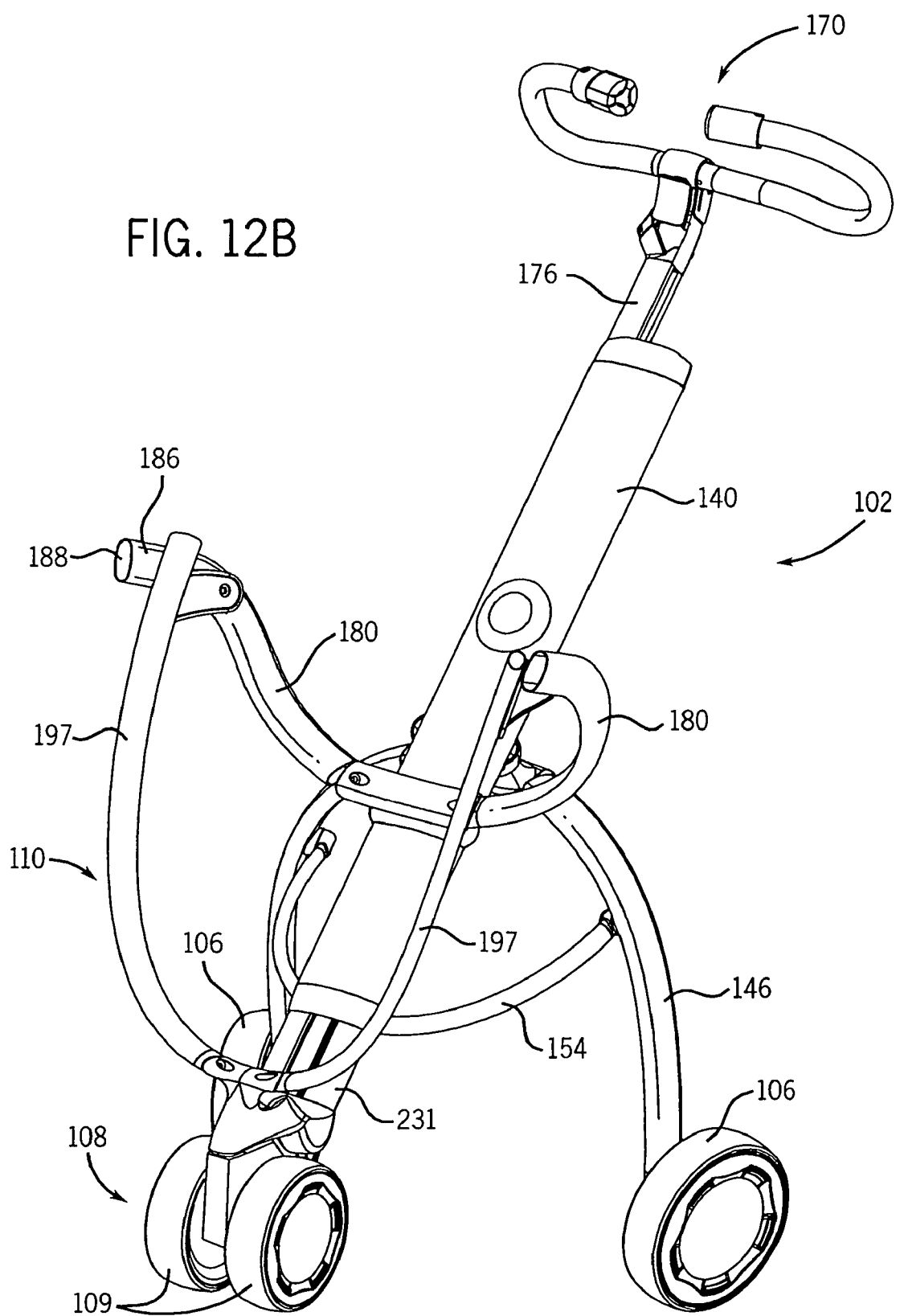
Figure 12C:
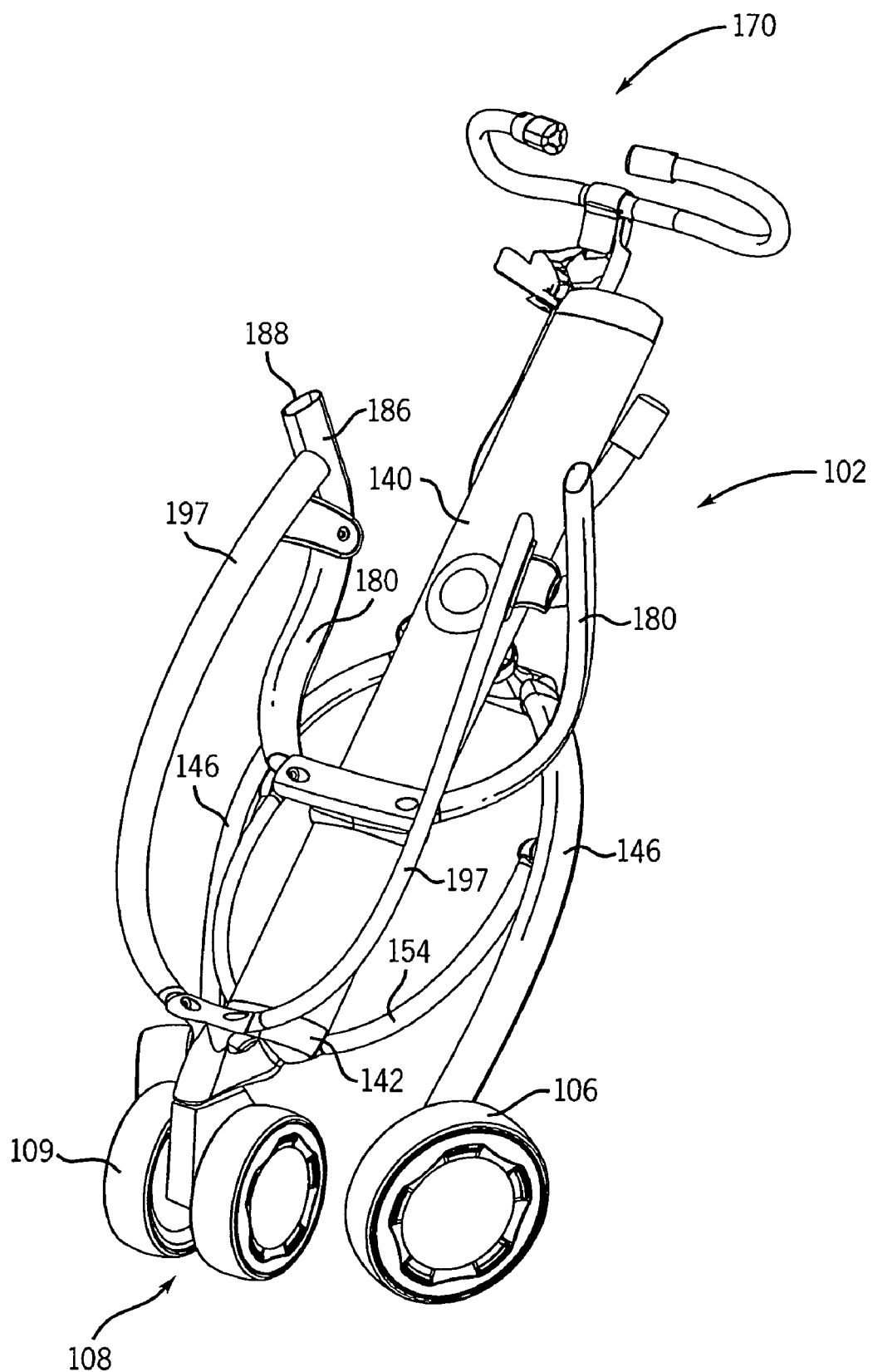

The above description does not mention the handle 170 folding from the in-use position to a collapsed position shown in FIGS. 10A-10C. The handle 170 can be configured to fold or collapse in concert with the stroller frame assembly 102. This is generically depicted in the previously noted FIGS. 1-11. The handle 170 can alternatively be configured to fold or collapse independently of the stroller frame assembly 102. This is depicted generically in FIGS. 12A-12C, which show the stroller frame in the in-use, partially folded, and completely collapsed configurations, respectively. These figures also show the handle 170 remaining in the in-use configuration. The handle 170 and its structure and folding arrangements will now be described in greater detail.

In another aspect of the present invention as shown in FIGS. 13-18, the handle 170 can also be collapsed and folded relative to the stroller 100, and particularly relative to the stanchion 176. In the disclosed example, each section 172 of the handle 170 has an outward extending lateral bar part 260. The bar parts 260 extend in opposite directions from opposite sides of the bracket 174. The lateral bar part 260 on each section 172 is not necessarily linear but can be generally linear to form a handle bar configuration. Any part of the lateral bar parts 260 can be gripped by a user.

Each section 172 also has a curved end part 262 extending from the end of the bar part 260 and curving generally upward. Each curved end part 262 has an upward and inward extending grip part 264. The grip parts 264 in the disclosed example generally extend toward one another and are spaced above the linear bar parts 260. The handle bar parts, curved parts, and grip parts provide multiple gripping locations on the handle 170 for a user. As will be evident to those having ordinary skill in the art, the size, shape, and contour of these parts can vary without departing from the spirit and scope of the present invention. The disclosed handle 170 can be grasped on virtually any of the parts of each section as desired by a user. Each portion on the handle 170 can provide a different grip angle, grip height, and hand location for the user.

The handle 170 disclosed herein can be folded by manipulating the handle and the bracket 174. The bracket 174 includes three general components including a stanchion part 266 coupled to the end of the stanchion 176, an intermediate coupling 268, and a handle part 270 carried on the handle between the two linear bar parts 260. The intermediate coupling 268 pivotally interconnects the handle part 270 to the stanchion part 266 at two rotational joints (see FIGS. 15, 17, and 18). A first joint 272 is formed by a pivot pin or post (not shown) projecting from one end of the coupling 268 and extending into a bore or receptacle (also not shown) in a surface 278 on the stanchion part 266. The surface 278 forms a bearing surface for another surface 280 on the intermediate coupling 268 that forms a complimentary bearing surface. The bearing surface 278 on the stanchion part 266 is carried on an ear 282 that projects laterally outward at an angle from one side of the stanchion bracket 266. The ear terminates in the surface 278. The surface lies in a plane that is inclined at an angle of about 45° in the disclosed example relative to the center or spine axis S of the stroller 100. Thus, as shown in FIGS. 13 and 15, the intermediate coupling 268 can rotate at the joint 272 about the axis H1 against the surface 278, and when doing so rotates in a plane that is about 45° offset from the axis of the stroller.

Figure 13:
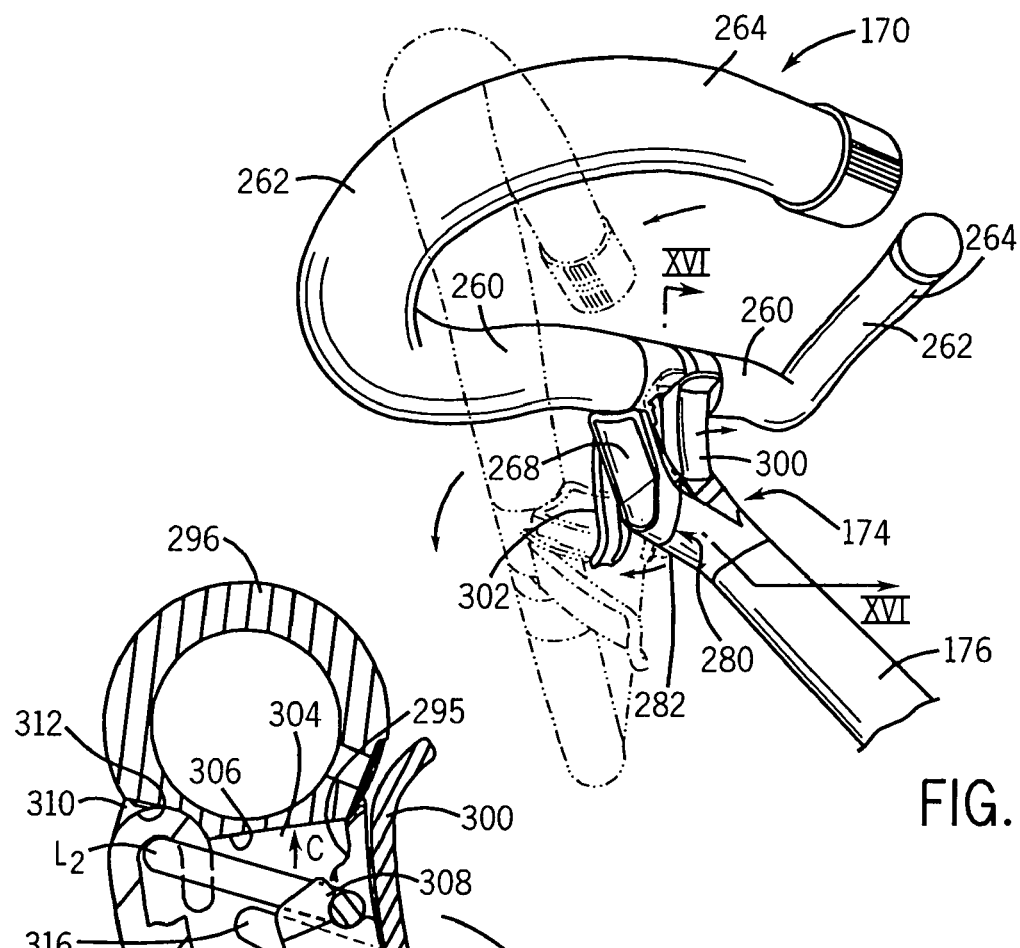
FIG. 13 shows a perspective enlarged view of the handle assembly for the stroller shown in FIG. 1 in the in-use position and shows the handle in a partly collapsed position in phantom view.
Figure 14:
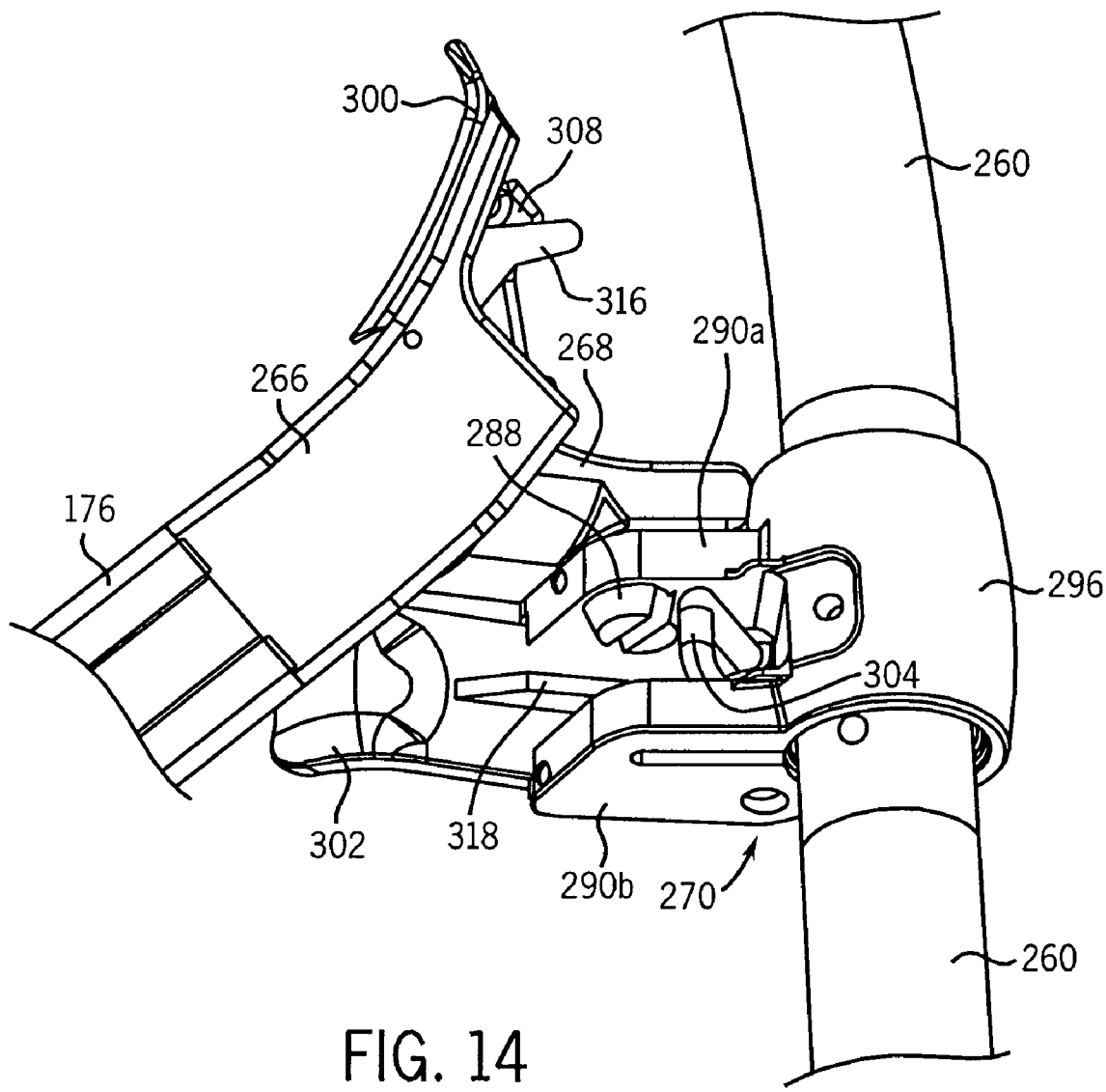
FIG. 14 shows an enlarged side view of the handle in FIG. 13 in the partly collapsed position.
Figure 15:
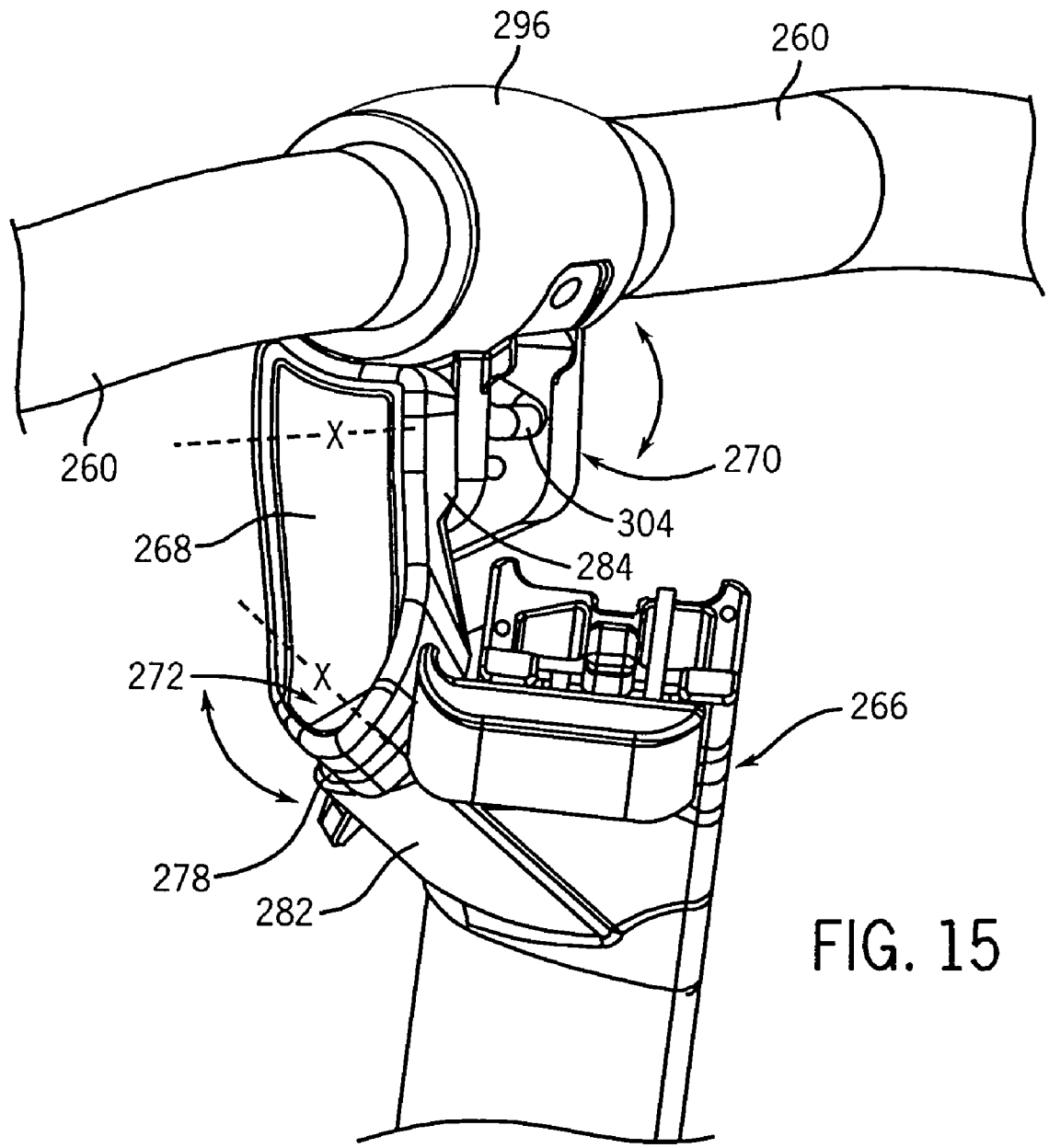
FIG. 15 shows a top view of the handle bracket in FIG. 14.

As illustrated in FIGS. 13 and 15, the other end of the intermediate coupling 268 has a handle connector part 284 oriented at an angle relative to the one end and the bearing surface 280. The connector part 284 in the disclosed example is at an angle of about 45° to the one end of the coupling. Thus, when the intermediate coupling 268 is rotated from an in-use position shown in FIG. 13 in the direction of folding indicated by the arrows to the collapsed position shown in FIG. 17, the connector part 284 changes in orientation from extending generally vertically upright and parallel to the axis S of the stroller to extending horizontal and generally perpendicular to the axis S. As can be seen in FIG. 14, a handle pin or post 288 projects perpendicularly from a surface of the connector part 284. The handle post 288 extends from the connector part 284 and is thus obliquely angled relative to the bearing surface 280 on the coupling part 268. Thus, as shown in FIGS. 13-15 and 17, when the coupling par 268 is rotated from the in-use orientation to the folded orientation, the handle post 288 also moves from an orientation generally perpendicular or normal to the stroller axis S to an orientation generally parallel to and spaced from the stroller center axis S.

As shown in FIGS. 14 and 15, the handle part 270 of the bracket 174 includes a pair of spaced apart carriage extensions 290a, 290b. A bore 292 is formed through the extension 290a. The other extension 290b can have a similar bore or smaller bore (neither being shown) formed therethrough as well that aligns with the bore 292. The handle post 288 in the coupling's L connector part 284 is received through the bore 292 in the carriage extension 290a. The arrangement forms a trunnion-like connection between the handle 170 and the bracket 174. The post can extend to the other extension 290b for stability if desired. Also, a wire pin can extend through the short post 288 in this example, and can extend to a bore in the other extension 290b. This arrangement forms a second joint 291 of the coupling part 268.

Figure 18:
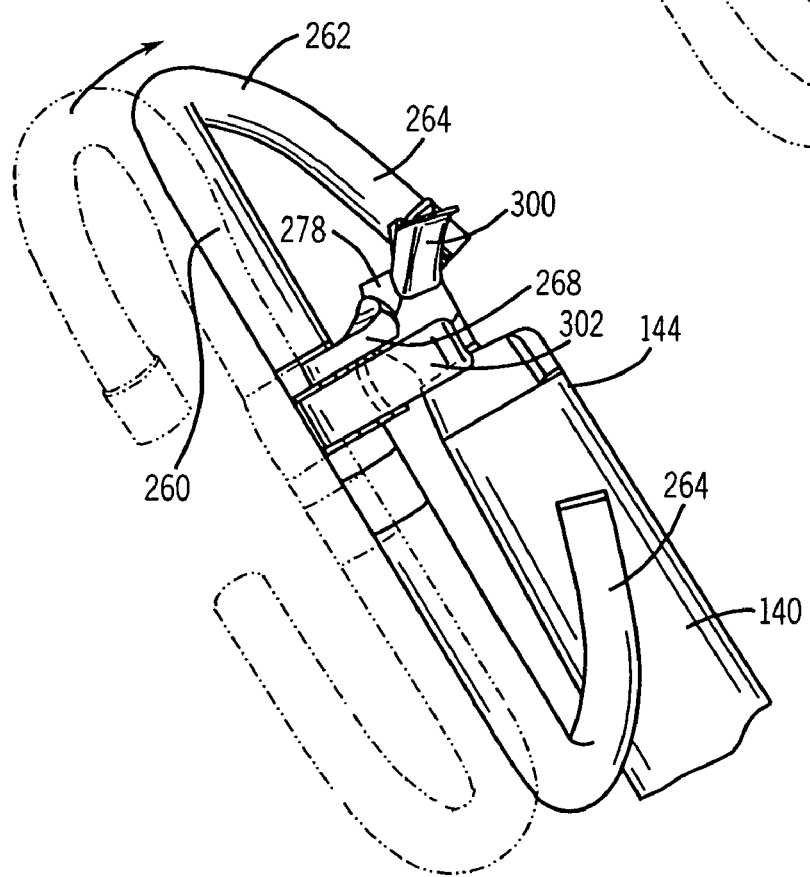
FIG. 18 shows the handle assembly in its fully collapsed position and shows the handle in phantom prior to being rotated to its fully collapsed position.

As shown in phantom in FIG. 18 and by the arrows in FIGS. 14 and 15, the handle 170 can pivot about the handle pin 288 about the axis of the aligned bores 292. The handle 170 can pivot from an in-use position where the handle is rotated rearward about the axis H2 of the bore 292 and post 288. In this position, a linear bar part 260 of the handle rests against a curved stop surface 294 formed on an edge of the connector part 284. The stop surface 294 prevents the handle from rotating further and keeps the handle in position when the intermediate coupling 268 is in the in-use position as shown in FIG. 13. Two fingers 295 extend upward from the stanchion part 266 toward the handle 170. A barrel portion 296 of the handle bracket part 270 seats against an end of these fingers 295. The barrel 296 seats against the stop surface 294 and the fingers 295 to provided a stable nesting place for the handle in the in-use configuration. During use, the handle 170 does not rotate rearward or downward as it is held in place. The handle does not freely rotate forward or upward in the in-use configuration. The barrel 296 is firmly sandwiched between the stop surface 294 and the fingers 295.

Figure 16:
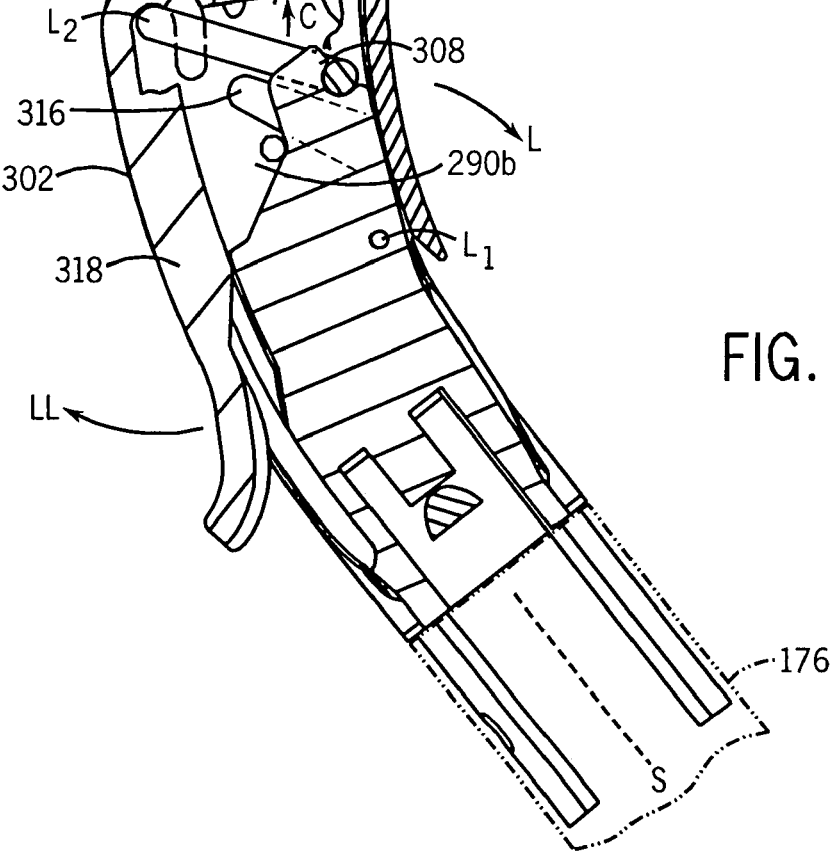
FIG. 16 shows a cross section of the handle taken along line XV-XV in FIG. 13.

In the disclosed example, the handle 170 includes two separate release or lock levers as shown in FIG. 13. A safety release lever 300 is positioned on a top side of the bracket 174 and pivots about a point L1. A latch lever 302 is positioned on the bottom side of the bracket 174 and pivot about a point L2. As shown in FIG. 16, in the assembled bracket 174 a wire catch 304 is pivotally retained on the handle part 270 of the bracket between the pair of carriage extensions 290 and captured between an interior face 306 on the underside of the part 270 and the post 288. A hook 308 protrudes upward from the stanchion part 266 of the bracket and is positioned between the fingers 295. A face on a side of the hook 308 facing away from the catch 304 has a depression configured to mate with the cross-section shape of the wire catch 304. The catch 304 also pivot about the point L2 and can pivot upward off the hook in the direction of the arrow C and down onto the hook as shown in FIG. 13.

An over-center bump 310 on the pivot end of the lever 302 bears against a surface of the barrel 296 and retains the lever in the latched position shown in FIG. 16. The lever also has a turned up end 312 that acts to drive down the catch onto the hook 308 when the lever is raised in the direction of the arrow LL. Thus, the lever 300 is a latch lever to lock the handle in the in0use position as shown in FIG. 13. The center rib 314 in FIG. 13 adds rigidity to the lever 302 to permit driving the catch downward with sufficient force without bending the lever.

An underside of the safety latch lever 300 has a release projection 316 that slips into the interior of the bracket 174 when the safety latch lever is pushed or pivoted downward into a latched position as shown in FIG. 13. When the lever 300 is pivoted out and down in the direction of the arrow L, the protrusion or projection 316 rises and forces the catch upward from the hook 308. The lever 300 is thus a release lever. The lever 300 can remain in the ready position when latching the handle, or can rotate forward after the catch 304 is seated in the depression on the hook 308. The protrusion 316 can forcibly bypass the catch to the ready position as shown.

Figure 17:
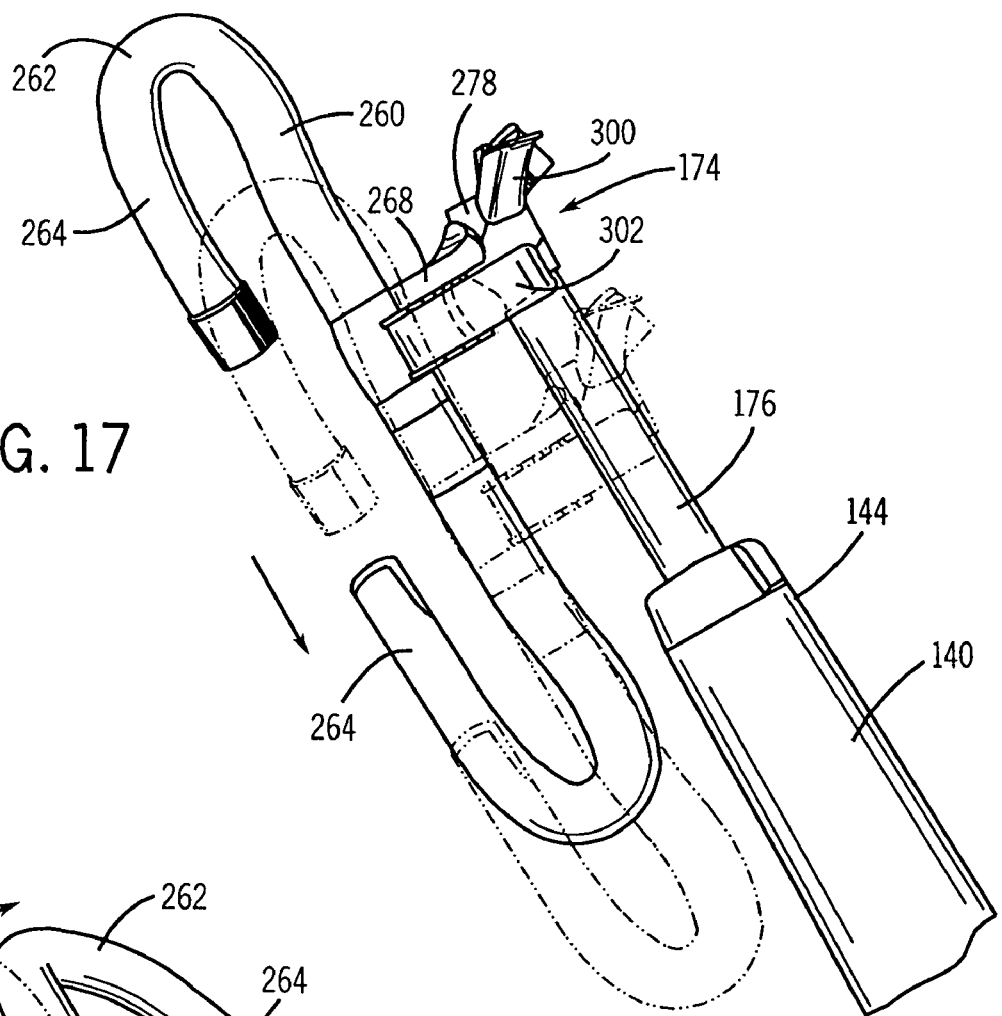
FIG. 17 shows the handle in a further collapsed position and shows the handle assembly in phantom pushed further down onto the stroller frame.

To collapse the handle 170 from the in-use position of FIG. 13, the release lever 300 is first pulled out to unseat the catch 304. The user can then rotate the handle 170 and the handle part 270 of the bracket downward and sideways, which in turn rotates the intermediate coupling 268 of the bracket about the first joint 272. The handle 170, bracket part 270, and coupling part 268 will rotate downward and sideways to the position as shown in FIG. 17. The handle can then be rotated about the handle post 288 inward toward the center axis S of the stroller as shown in FIG. 18. Thus, the entire handle 170 can lie very close to the stanchion 176. The stanchion can also be pushed downward into the spine 140 as shown in FIGS. 17 and 18 to completely fold or collapse the remainder of the stroller as described above. As noted above, the handle 170 can fold with the stroller frame or independent of the stroller frame.

As will be evident to those having ordinary skill in the art, the various components and parts of the bracket 174 can be modified greatly within the sprit and scope of the present invention. Parts can be reconfigured and rearranged and still function as described. Parts can be modified to a greater extent to create alternative compact handle folds.

Figure 19:
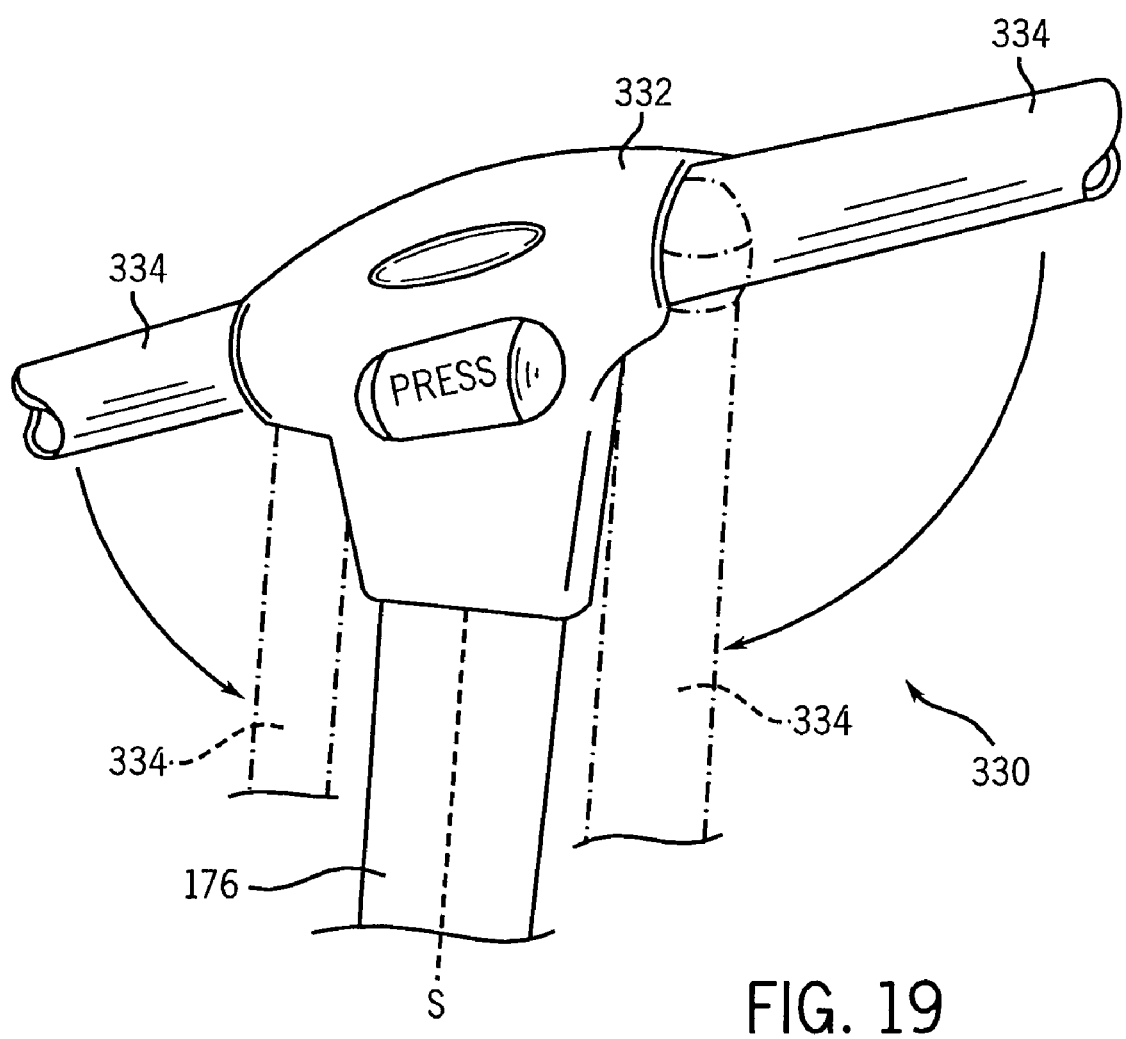
FIG. 19 shows another example of a handle assembly constructed in accordance with the teachings of the present invention.

For example, FIG. 19 generically represents a handle assembly 330 with a mounting bracket assembly 332 coupled to the stanchion 176. In this example, the bar parts 334 of the handle assembly can pivot directly downward to a position parallel with the spine axis S. In one example, the bar parts 334 can move in unison so that if one is rotated, the other follow. The parts can also be completely independent of one anther if desired. Other handle arrangements are also certainly within the spirit and scope of the present invention.

Although certain stroller frame, cup holder, and handle features and examples have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A collapsible stroller frame reconfigurable between a ready for use configuration and a collapsed configuration, the stroller frame comprising:

a frame spine positioned generally along a center lengthwise axis of the stroller frame with a forward end coinciding with a front of the stroller frame and a rear end elevated above the forward end and coinciding with a back of the stroller frame;

a stanchion extending from the rear end of the spine and slidable lengthwise relative to the lengthwise axis between a retracted position in the collapsed configuration and an extended position in the ready for use configuration;

a bracket near a free end of the stanchion; and a handle coupled to the bracket and having a cross bar section that is foldable between an in-use position extending from the rear end of and generally perpendicular to the lengthwise axis of the stroller and a completely collapsed position lying generally parallel to the lengthwise axis, wherein the bracket has one part configured to facilitate moving the handle sideways away from the in-use position to a partly collapsed position with the cross bar lying generally parallel to the lengthwise axis, and having another part configured to facilitate moving the handle from the partly collapsed position closer to the stanchion to the completely collapsed position.

2. A stroller frame according to claim 1, wherein the spine further comprises a base part and an extension part telescopically connected with the base part, the base and extension parts being slidable between a shortened spine length in the collapsed configuration and an extended spine length in the ready for use configuration.

3. A stroller frame according to claim 2, wherein the stanchion is slidable relative to the spine.

4. A stroller frame according to claim 3, further comprising a drive mechanism carried by the stroller frame, wherein sliding the stanchion in the direction of the forward end of the spine end operates the drive mechanism to slide the base and extension parts to the shortened spine length, and wherein sliding the stanchion away from the forward end of the spine operates the drive mechanism to slide the base and extension parts to the extended spine length.

5. A stroller frame according to claim 4, wherein the drive mechanism is a rack and pinion gear assembly with a pinion gear carried by the spine and a rack gear carried on the stanchion.

6. A stroller frame according to claim 1, wherein the handle is movable independent of the position of the stanchion and independent of the configuration of the stroller frame.

7. A stroller frame according to claim 1, wherein the stanchion is slidably retractable along the spine.

8. A stroller frame according to claim 1, wherein the bracket includes a latch configured to secure the handle in the in-use position and a release lever configured to release the latch.

9. A stroller frame according to claim 1, wherein the one part of the bracket has a fixed bearing surface attached to the stanchion and a mating bearing surface attached to the handle, wherein the fixed and mating bearing surfaces abut one another and are arranged at an angle of about 45 degrees relative to the lengthwise axis of the stroller frame.

10. A stroller frame according to claim 9, further comprising a post oriented perpendicular to the fixed and mating bearing surfaces, wherein the handle can pivot about the post from the in-use position to the partially collapsed position.

11. A stroller frame according to claim 1, wherein the other bracket part has a pivot pin defining an axis of rotation that is perpendicular to the stanchion when the handle is in the in-use position and that is parallel to the stanchion when the handle is in the partially collapsed position, and wherein the handle can rotate about the axis of rotation toward and away from the stanchion.

12. A stroller frame according to claim 1, further comprising a rack and pinion gear assembly carried by the stroller frame, wherein a first rack gear is carried on the stanchion, a second rack gear is carried on the base part of the spine, and a pinion gear is carried on the extension part of the spine and positioned between the first and second racks, whereby sliding the stanchion along the lengthwise axis slides the stanchion relative to the spine and slides the base and extension parts relative to one another.

13. A stroller frame according to claim 12, wherein the handle can be used to slide the stanchion by pushing the handle toward the forward end of the spine or pulling the handle away from the rear end of the spine.

14. A stroller frame according to claim 1, wherein the handle further comprises a curved grip section extending from each end of the cross bar, and wherein the other part of the bracket facilitates rotating the cross bar, which pivots the curved grip sections closer to the stanchion in the completely collapsed position.

15. A stroller frame according to claim 14, further comprising a free end portion on each curved grip section, wherein the free end portions each extend toward the other and are generally parallel to the cross bar.

16. A stroller frame according to claim 14, wherein each curved grip section is generally C-shaped.

* * * * *